(12) United States Patent
Do et al.

(10) Patent No.: US 11,450,963 B2
(45) Date of Patent: Sep. 20, 2022

(54) ELECTRONIC DEVICE AND METHOD FOR SELECTIVELY OPENING OR CONNECTING SWITCH CONNECTED TO ANTENNA BASED ON IDENTIFICATION INFORMATION RECEIVED FROM EXTERNAL ELECTRONIC DEVICE

(71) Applicant: Samsung Electronics Co., Ltd., Suwon-si (KR)

(72) Inventors: Joohoan Do, Suwon-si (KR); Seonghoon Kang, Suwon-si (KR); Kihyun Kim, Suwon-si (KR); Sujin Paik, Suwon-si (KR); Kumjong Sun, Suwon-si (KR); Yongsang Yun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 23 days.

(21) Appl. No.: 17/270,829

(22) PCT Filed: Jun. 10, 2019

(86) PCT No.: PCT/KR2019/006951
§ 371 (c)(1),
(2) Date: Feb. 23, 2021

(87) PCT Pub. No.: WO2020/040410
PCT Pub. Date: Feb. 27, 2020

(65) Prior Publication Data
US 2021/0194131 A1    Jun. 24, 2021

(30) Foreign Application Priority Data

Aug. 23, 2018  (KR) .................. 10-2018-0098693

(51) Int. Cl.
*H01Q 7/00*     (2006.01)
*H01Q 1/24*     (2006.01)
*H01Q 1/38*     (2006.01)

(52) U.S. Cl.
CPC ................. *H01Q 7/00* (2013.01); *H01Q 1/24* (2013.01); *H01Q 1/38* (2013.01)

(58) Field of Classification Search
CPC ............... H01Q 7/00; H01Q 1/24; H01Q 1/38
(Continued)

(56) References Cited

U.S. PATENT DOCUMENTS

2012/0242164 A1    9/2012   Teggatz et al.
2015/0144694 A1    5/2015   Choi et al.
(Continued)

FOREIGN PATENT DOCUMENTS

JP      2015-008578 A      1/2015
JP      2016-123266 A      7/2016
(Continued)

OTHER PUBLICATIONS

International Search Report dated Sep. 23, 2019 in connection with International Patent Application No. PCT/KR2019/006951, 2 pages.
(Continued)

*Primary Examiner* — Andrea Lindgren Baltzell

(57) ABSTRACT

An electronic device, according to various embodiments, may comprise: a first antenna for obtaining power to be used for executing a function from a wireless signal transmitted from an external electronic device; and a second antenna for identifying information related to the function from the wireless signal. The first antenna, which is relatively larger than the second antenna, may be selectively opened or connected by means of a switch. When the wireless signal transmitted from the external electronic device includes identification information corresponding to the electronic device, the first antenna may be electrically connected to thus have a closed loop structure. The electronic device may electrically separate the first antenna. The first antenna may be electrically separated to thus have an open loop structure. The first antenna having an open loop structure may not interfere with wireless communication between the external electronic device and another external electronic device.

15 Claims, 16 Drawing Sheets

(58) Field of Classification Search
USPC .......................................................... 343/702
See application file for complete search history.

(56) References Cited

U.S. PATENT DOCUMENTS

| | | | |
|---|---|---|---|
| 2016/0204836 A1* | 7/2016 | Lee | H02J 50/10 343/702 |
| 2017/0364718 A1 | 12/2017 | Finke | |
| 2018/0219986 A1 | 8/2018 | Lee et al. | |
| 2019/0067799 A1* | 2/2019 | Han | H04B 5/0081 |
| 2019/0097686 A1* | 3/2019 | Ichikawa | H04B 5/0031 |
| 2019/0222063 A1 | 7/2019 | Park et al. | |

FOREIGN PATENT DOCUMENTS

| | | |
|---|---|---|
| KR | 10-2013-0016588 A | 2/2013 |
| KR | 10-1505456 B1 | 3/2015 |
| KR | 10-2015-0060470 A | 6/2015 |
| KR | 10-1594380 B1 | 2/2016 |

OTHER PUBLICATIONS

Written Opinion of the International Searching Authority dated Sep. 23, 2019 in connection with International Patent Application No. PCT/KR2019/006951, 4 pages.

* cited by examiner

ELECTRONIC DEVICE AND METHOD FOR SELECTIVELY OPENING OR CONNECTING SWITCH CONNECTED TO ANTENNA BASED ON IDENTIFICATION INFORMATION RECEIVED FROM EXTERNAL ELECTRONIC DEVICE

CROSS-REFERENCE TO RELATED APPLICATIONS

This application is a 371 of International Application No. PCT/KR2019/006951 filed on Jun. 10, 2019, which claims priority to Korean Patent Application No. 10-2018-0098693 filed on Aug. 23, 2018, the disclosures of which are herein incorporated by reference in their entirety.

BACKGROUND

1. Field

Various embodiments described below relate to an electronic device for selectively opening or closing an antenna in response to an approach of another electronic device, and a method therefor.

2. Description of Related Art

Near field communication (NFC) is a technology that is used in order for electronic devices located adjacent to each other to perform wireless communication. The electronic devices using NFC may transmit or receive power and data using wireless signals.

An antenna included in an electronic device may be an element that may distort or change the electromagnetic field therearound. In the case where an electronic device is located between two other electronic devices that are distinguished from the electronic device, the antenna of the electronic device may affect the electromagnetic field formed for communication or power transmission between two other electronic devices, thereby interrupting wireless communication between two other electronic devices or degrading performance thereof. Alternatively, loss of power transmission may occur between two other electronic devices.

The technical subjects pursued in the disclosure may not be limited to the above mentioned technical subjects, and other technical subjects which are not mentioned may be clearly understood, through the following descriptions, by those skilled in the art to which the disclosure pertains.

SUMMARY

An electronic device according to various embodiments may include: a first loop antenna; a second loop antenna disposed to at least partially overlap the first loop antenna; a switch configured to selectively open or connect the first loop antenna; and a control circuit, wherein the control circuit may be configured to receive identification information using the second loop antenna in a state in which the first loop antenna is electrically opened, electrically connect the first loop antenna using the switch, based at least on the identification information, and wirelessly receive power from an external electronic device using the first loop antenna in a state in which the first loop antenna is electrically connected.

An electronic device according to various embodiments may include: a first loop antenna; a second loop antenna disposed to at least partially overlap the first loop antenna; a switch configured to selectively open or connect the first loop antenna; and a control circuit, wherein the control circuit may be configured to receive identification information of an external electronic device which is distinguished from the electronic device using the second loop antenna, connect the first loop antenna using the switch if the identification information is specified identification information, and open the first loop antenna using the switch if the identification information is not the specified identification information.

An electronic device that is attachable to an external electronic device according to various embodiments may include: a first antenna; a second antenna; a switch disposed on the first antenna and configured to change an electrical state of the first antenna; and a control circuit operatively coupled to the switch, wherein the control circuit may be configured to obtain power from the external electronic device using the first antenna in an electrical state corresponding to a closed circuit in a state in which the electronic device is attached to the external electronic device, identify that another external electronic device, which is distinguished from the external electronic device, approaches the electronic device attached to the external electronic device using the second antenna while obtaining the power, and switch the electrical state of the first antenna from the electrical state corresponding to the closed circuit to an electrical state corresponding to an open circuit by controlling the switch in response to the approach of the another external electronic device.

An electronic device according to various embodiments may disconnect an antenna included in the electronic device in response to wireless communication between two other electronic devices distinguished from the electronic device, thereby preventing distortion of an electromagnetic field by the antenna. The electronic device is able to reduce an effect of the antenna on the electromagnetic field formed for communication or power transmission between the two other electronic devices. It is possible to prevent interruption of wireless communication between two other electronic devices or degradation of performance thereof. In addition, loss of power transmission between two other electronic devices is able to be reduced.

Advantageous effects obtainable from the disclosure may not be limited to the above mentioned effects, and other effects which are not mentioned may be clearly understood, through the following descriptions, by those skilled in the art to which the disclosure pertains.

DETAILED DESCRIPTION

Figure 1:
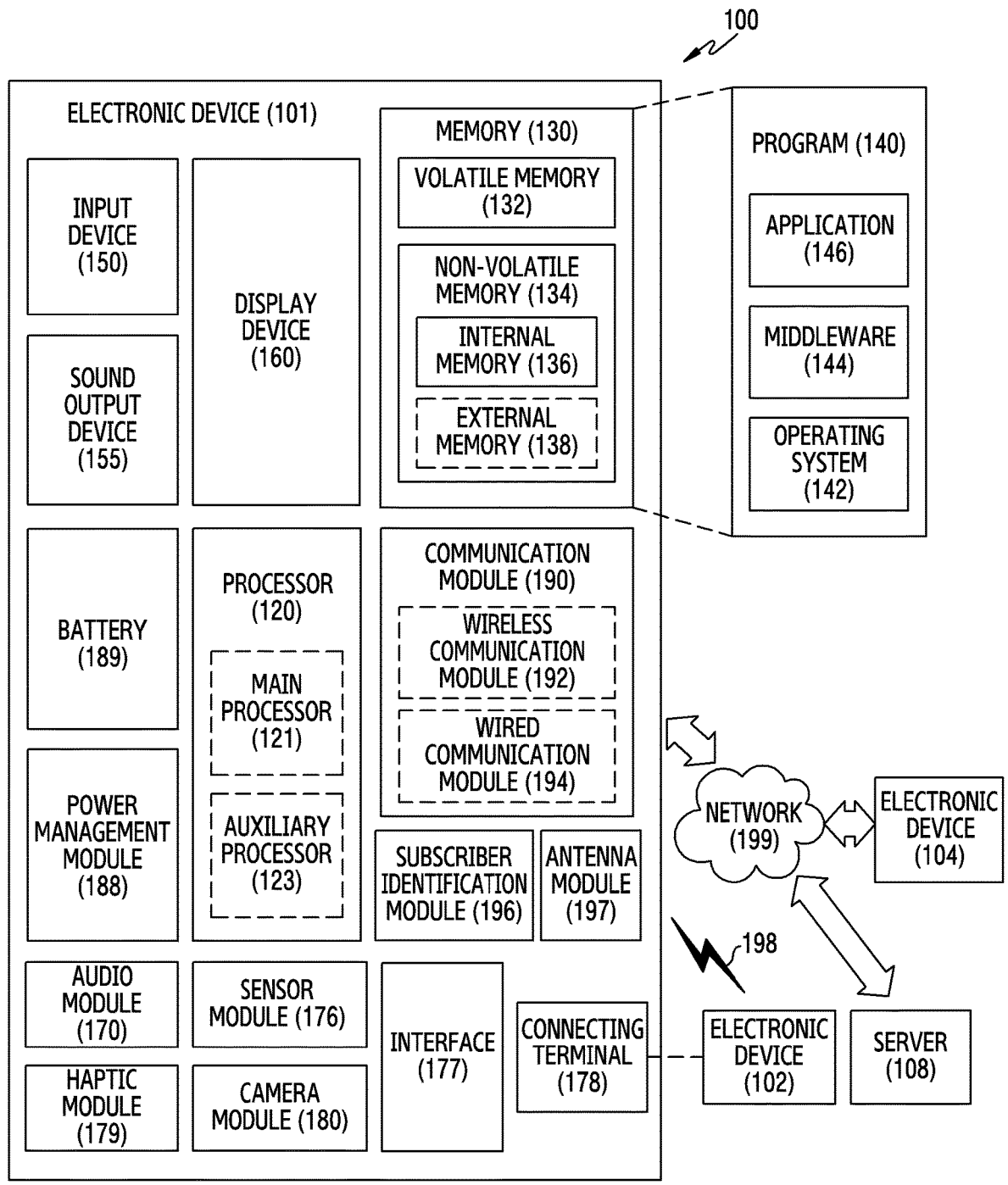
FIG. 1 is a block diagram of an electronic device in a network environment according to various embodiments.

Hereinafter, various embodiments of the disclosure will be described with reference to the accompanying drawings. However, it should be appreciated that they are not intended to limit the technological features set forth herein to particular embodiments and include various changes, equivalents, and/or alternatives for the embodiments of the disclosure. With regard to the description of the drawings, similar reference numerals may be used to designate similar or relevant elements.

As used herein, the expression "have", "may have", "include", or "may include" refers to the existence of a corresponding feature (e.g., numeral, function, operation, or constituent element such as component) and does not exclude the existence of additional features.

As used herein, the expression "A or B", "at least one of A and/or B", or "one of more of A and/or B" may include all possible combinations of items enumerated together. For example, "A or B", "at least one of A and B", or "at least one of A or B" may refer to all of (1) including at least one A, (2) including at least one B, or (3) including all of at least one A and at least one B.

The expressions "a first", "a second", "the first", "the second", and the like as used herein may modify various elements regardless of the order and/or the importance thereof, and are used merely to distinguish between one element and any other element without limiting the corresponding elements. For example, a first user device and a second user device may indicate different user devices regardless of the order or importance thereof. For example, a first element may be termed a second element, and similarly, a second element may be termed a first element without departing from the scope of the disclosure.

It should be understood that when an element (e.g., first element) is referred to as being (operatively or communicatively) "connected" or "coupled" to another element (e.g., second element), it may be directly connected or coupled directly to the other element or any other element (e.g., third element) may be interposer between them. In contrast, it should be understood that when an element (e.g., first element) is referred to as being "directly connected" or "directly coupled" to another element (second element), there are no element (e.g., third element) interposed between them.

The expression "configured to" used in the disclosure may be interchangeably used with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the disclosure are only used to describe specific embodiments, and are not intended to limit the disclosure. A singular expression may include a plural expression unless they are definitely different in a context. Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

An electronic device according to various embodiments of the disclosure may include at least one of, for example, a smartphone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., watch, ring, bracelet, anklet, necklace, glasses, contact lens, or head-mounted device (HMD)), a fabric or clothing-integrated type (e.g., electronic clothing), a body-mounted type (e.g., skin pad, or tattoo), and a bio-implantable type (e.g., implantable circuit).

According to some embodiments, the electronic device may be a home appliance. The hole appliance may include at least one of, for example, a television, a digital video disk (DVD) player, an audio, a refrigerator, an air conditioner, a vacuum cleaner, an oven, a microwave oven, a washing machine, an air purifier, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

According to other embodiments, the electronic device may include at least one of various medical devices (e.g., various portable medical measuring devices (blood glucose monitoring device, heart rate monitoring device, blood pressure measuring device, body temperature measuring device, etc.), magnetic resonance angiography (MRA), magnetic resonance imaging (MRI), computed tomography (CT) machine, ultrasonic machine, etc.), a navigation device, a global positioning system (GPS) receiver, an event data recorder (EDR), a flight data recorder (FDR), a vehicle infotainment device, electronic equipment for a ship (e.g., ship navigation device, gyro-compass, etc.), avionics, a security device, an automobile head unit, a home or industrial robot, an automatic teller's machine (ATM) in banks, point of sales (POS) in a shop, or Internet of things devices (e.g., light bulb, various sensors, electric or gas meter, sprinkler device, fire alarm, thermostat, streetlamp, toaster, sporting goods, hot water tank, heater, boiler, etc.).

According to some embodiments, the electronic device may include at least one of a part of furniture or a building/structure, an electronic board, an electronic signature receiving device, a projector, and various kinds of measuring instruments (e.g., water meter, electric meter, gas meter, radio wave meter, etc.). In various embodiments, the electronic device may be a flexible electronic device or a foldable electronic device. Further, the electronic device according to embodiments of the disclosure is not limited to the aforementioned devices, and may include a new electronic device according to the development of technology.

In the disclosure, the term "user" may refer to a person using an electronic device or a device (e.g., artificial intelligence electronic device) using an electronic device.

Hereinafter, various embodiments of the disclosure will be described in detail with reference to the accompanying drawings. In the accompanying drawings, the sizes of some elements may be exaggerated or reduced for the convenience of description. For example, the size and thickness of each element are arbitrarily illustrated for the convenience of description, and thus the disclosure is not limited by the illustrated size and thickness.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally, or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
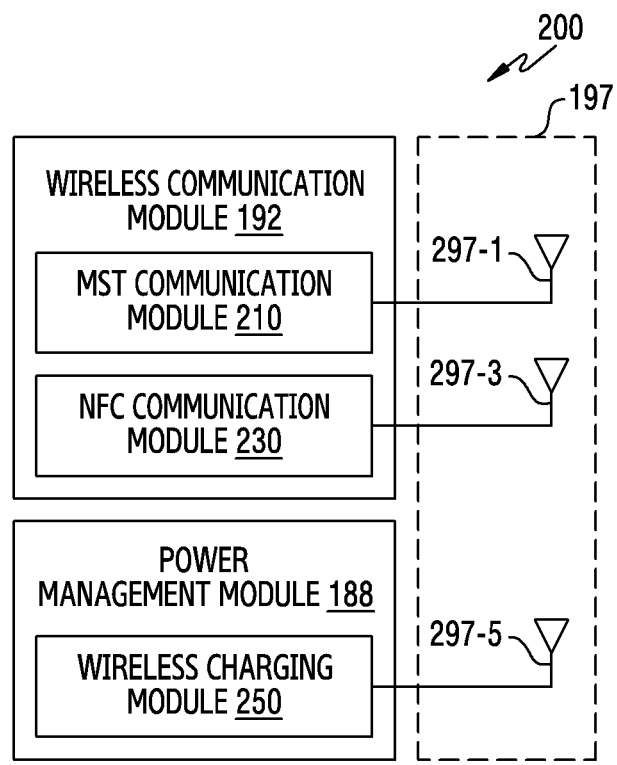
FIG. 2 is a block diagram of a wireless communication module, a power management module, and an antenna module of an electronic device according to various embodiments.

FIG. 2 is a block diagram 200 illustrating the wireless communication module 192, the power management module 188, and the antenna module 197 of the electronic device 101 according to various embodiments. Referring to FIG. 2, the wireless communication module 192 may include a magnetic secure transmission (MST) communication module 210 or a near-field communication (NFC) module 230, and the power management module 188 may include a wireless charging module 250. In such a case, the antenna module 197 may include a plurality of antennas that include a MST antenna 297-1 connected with the MST communication module 210, a NFC antenna 297-3 connected with the NFC communication module 230, and a wireless charging antenna 297-5 connected with the wireless charging module 250. For ease of description, the same components as those described in regard to FIG. 1 are briefly described or omitted from the description.

The MST communication module 210 may receive a signal containing control information or payment information such as card information from the processor 120, generate a magnetic signal corresponding to the received signal, and then transfer the generated magnetic signal to the external electronic device 102 (e.g., a point-of-sale (POS) device) via the MST antenna 297-1. To generate the magnetic signal, according to an embodiment, the MST communication module 210 may include a switching module (not shown) that includes one or more switches connected with the MST antenna 297-1, and control the switching module to change the direction of voltage or current supplied to the MST antenna 297-1 according to the received signal. The change of the direction of the voltage or current allows the direction of the magnetic signal (e.g., a magnetic field) emitted from the MST antenna 297-1 to change accordingly. If detected at the external electronic device 102, the magnetic signal with its direction changing may cause an effect (e.g., a waveform) similar to that of a magnetic field that is generated when a magnetic card corresponding to the card information associated with the received signal is swiped through a card reader of the electronic device 102. According to an embodiment, for example, payment-related information and a control signal that are received by the electronic device 102 in the form of the magnetic signal may be further transmitted to an external server 108 (e.g., a payment server) via the network 199.

The NFC communication module 230 may obtain a signal containing control information or payment information such as card information from the processor 120 and transmit the obtained signal to the external electronic device 102 via the NFC antenna 297-3. According to an embodiment, the NFC communication module 230 may receive such a signal transmitted from the external electronic device 102 via the NFC antenna 297-3.

The wireless charging module 250 may wirelessly transmit power to the external electronic device 102 (e.g., a cellular phone or wearable device) via the wireless charging antenna 297-5, or wirelessly receive power from the external electronic device 102 (e.g., a wireless charging device). The wireless charging module 250 may support one or more of various wireless charging schemes including, for example, a magnetic resonance scheme or a magnetic induction scheme.

According to an embodiment, some of the MST antenna 297-1, the NFC antenna 297-3, or the wireless charging antenna 297-5 may share at least part of their radiators. For example, the radiator of the MST antenna 297-1 may be used as the radiator of the NFC antenna 297-3 or the wireless charging antenna 297-5, or vice versa. In such a case, the antenna module 197 may include a switching circuit (not shown) adapted to selectively connect (e.g., close) or disconnect (e.g. open) at least part of the antennas 297-1, 297-3, or 297-5, for example, under the control of the wireless communication module 192 (e.g., the MST communication module 210 or the NFC communication module 230) or the power management module (e.g., the wireless charging module 250). For example, when the electronic device 101 uses a wireless charging function, the NFC communication module 230 or the wireless charging module 250 may control the switching circuit to temporarily disconnect at least one portion of the radiators shared by the NFC antenna 297-3 and the wireless charging antenna 297-5 from the NFC antenna 297-3 and to connect the at least one portion of the radiators with the wireless charging antenna 297-5.

According to an embodiment, at least one function of the MST communication module 210, the NFC communication module 230, or the wireless charging module 250 may be controlled by an external processor (e.g., the processor 120). According to an embodiment, at least one specified function (e.g., a payment function) of the MST communication module 210 or the NFC communication module 230 may be performed in a trusted execution environment (TEE). According to an embodiment, the TEE may form an execution environment in which, for example, at least some designated area of the memory 130 is allocated to be used for performing a function (e.g., a financial transaction or personal information-related function) that requires a relatively high level of security. In such a case, access to the at least some designated area of the memory 130 may be restrictively permitted, for example, according to an entity accessing thereto or an application being executed in the TEE.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,"

"coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively, or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3A:
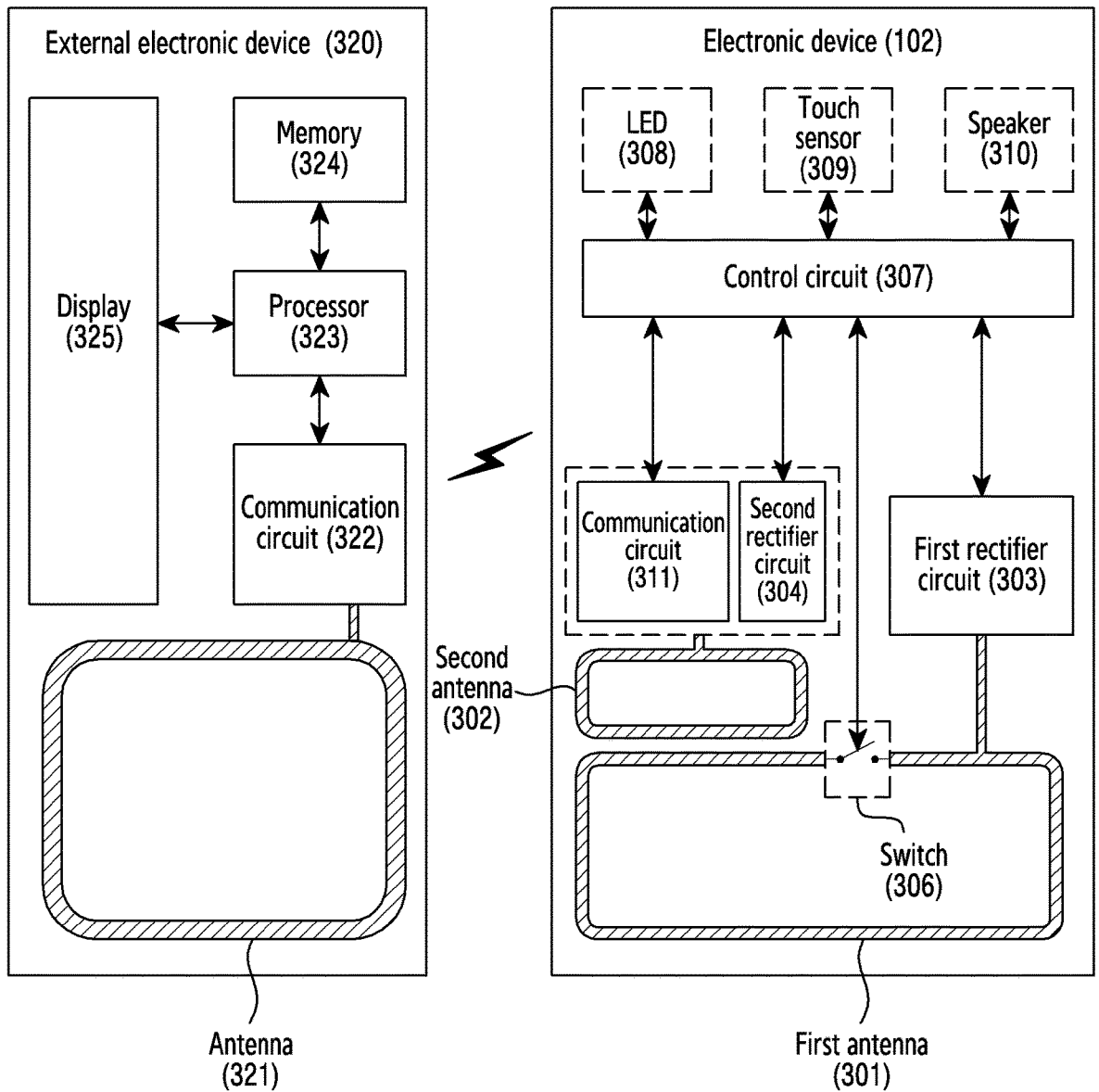
FIGS. 3A to 3B are block diagrams of an electronic device and an external electronic device according to various embodiments.
Figure 3B:
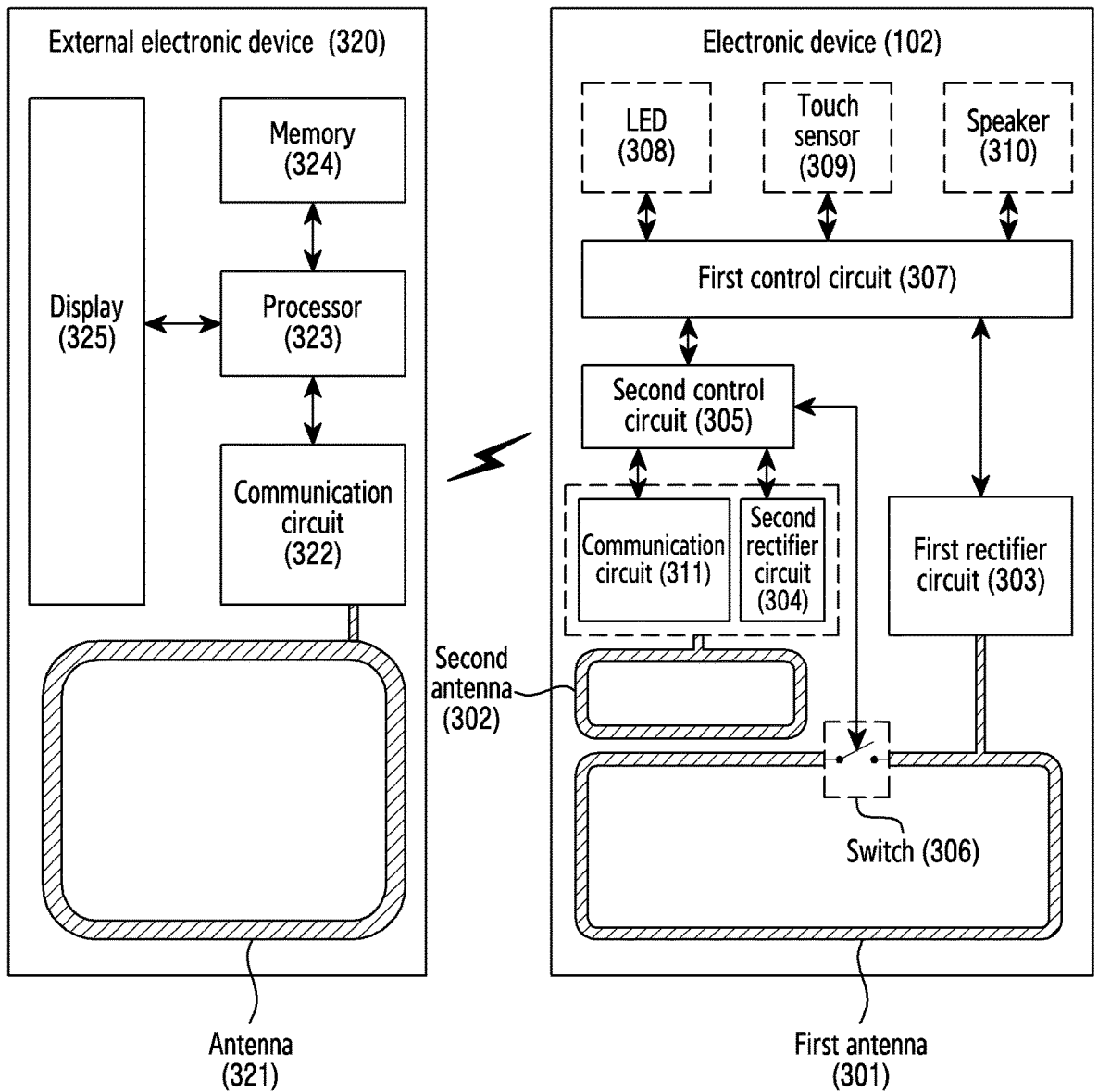

FIGS. 3A to 3B are block diagrams of an electronic device 102 and an external electronic device 320 according to various embodiments. The electronic device 102 in FIG. 3 may at least partially correspond to the electronic device 102 in FIG. 1. The external electronic device 320 in FIG. 3 may correspond to the electronic device 101 in FIG. 1. For convenience of description, some elements of the electronic device 102 and the external electronic device 320 may be omitted.

The electronic device 102 may include one or more antennas. Referring to FIG. 3A or 3B, the electronic device 102 may include a first antenna 301 and a second antenna 302. At least one of the first antenna 301 and the second antenna 302 may include a conductive wire. At least one of the first antenna 301 and the second antenna 302 may be a loop antenna in which a conductive wire is disposed in the shape of a loop, such as a coil. At least one of the first antenna 301 and the second antenna 302 may have one or more loops. The loop of the first antenna 301 and the loop of the second antenna 302 may be disposed to at least partially overlap each other. The size of the loop of the first antenna 301 may be greater than the size of the loop of the second antenna 302. The loop of the second antenna 302 may be disposed in the inner area of the loop of the first antenna 301. The first antenna 301 may be used for a power reception function of the electronic device 102. The second antenna 302 may be used for an authentication function related to the electronic device 102. The functions of the first antenna 301 and the second antenna 302 are not limited to the above-described functions, and both of the first antenna 301 and the second antenna 302 may be used for, for example, an authentication function or a data transmission function.

When an electromagnetic field is present in the loop of the first antenna 301, a current induced by the electromagnetic field may flow through the first antenna 301. Similarly, a current flowing through the second antenna 302 may be generated in response to the electromagnetic field in the loop of the second antenna 302. The current flowing through at least one of the first antenna 301 and the second antenna 302 may be used for wireless communication of the electronic device 102 or for power supply to the electronic device 102. Each of the first antenna 301 and the second antenna 302 may generate an electromagnetic field in the space therearound according to the flow of a current through the antenna.

The first antenna 301 having a larger loop than the second antenna 302 may have a loop shape including an open portion. For example, the first antenna 301 may have a loop shape including a portion that is able to be electrically opened by the switch 306 or an electrical component. According to various embodiments, the second antenna 302 having a smaller loop may have a closed loop structure. The first antenna 301 having a larger loop may selectively have a closed loop structure or an open loop structure. The open loop structure may indicate the structure of the first antenna 301 in the state in which an electrical connection is opened by the switch 306. The closed loop structure may indicate the structure of the first antenna 301 in the state in which an electrical connection is shorted by the switch 306. While the first antenna 301 has the open loop structure, even if an electromagnetic field is generated in the loop of the first antenna 301, a current corresponding to the electromagnetic field may not be induced in the first antenna 301, or may be reduced. Alternatively, the amount of induced current may be smaller than when the first antenna 301 has a closed loop.

In the case where the electronic device 102 includes a plurality of antennas, the electronic device 102 may include a plurality of rectifier circuits corresponding to the respective antennas. The respective rectifier circuits may generate power to be supplied to electronic circuits or electrical components included in the electronic device 102 from the current flowing through a corresponding antenna. Referring to FIG. 3A or 3B, the electronic device 301 may include a first rectifier circuit 303 corresponding to the first antenna 301 and a second rectifier circuit 304 corresponding to the second antenna 302.

If an electromagnetic field is generated in the loop of the second antenna 302, the second rectifier circuit 304 may receive a current induced in the second antenna 302 by the electromagnetic field. The current received by the second rectifier circuit 304 may be an alternating current signal having a specified period over time and a magnitude that changes with time. The second rectifier circuit 204 may generate, from the alternating current signal, a direct current signal having a constant magnitude of voltage or current over time. The direct current signal may be used as power for electronic circuits or electronic components included in the electronic device 102.

The first antenna 301 may selectively have a closed loop structure or an open loop structure. When the first antenna 301 has the open loop structure, a current corresponding to the electromagnetic field may not be induced to the first rectifier circuit 303. When the first antenna 301 has the open loop structure, the magnitude of the current induced in the first antenna 301 by the electromagnetic field may not be sufficient for the operation of the electronic device 102. Since a current corresponding to the electromagnetic field is not induced in the first rectifier circuit 303, the first rectifier circuit 303 may not generate power while the first antenna 301 has the open loop structure.

Alternatively, while the first antenna 301 has the open loop structure, the first rectifier circuit 303 may generate power having a magnitude insufficient for the operation of the electronic device 102. When the first antenna 301 has the closed loop structure, the first rectifier circuit 303 may receive a current induced in the first antenna 301 by the electromagnetic field. In response to reception of the current induced in the first antenna 301 by the electromagnetic field, the first rectifier circuit 303 may generate power to be used in electronic circuits or electronic components included in the electronic device 102, similarly to the description of the second rectifier circuit 304. At least a portion of the first antenna 301 or the second antenna 302 and the switch 306 may be disposed in the PCB. For example, at least a portion of the first antenna 301 and the switch 306 may be disposed in the PCB. The PCB may include the remaining electronic components of the electronic device 102 (e.g., at least one electronic component among a control circuit 307, a communication circuit 311, the first rectifier circuit 303, the second rectifier circuit 304, an LED 308, a touch sensor 309, and a speaker 310).

Referring to FIG. 3A, the electronic device 102 according to various embodiments may include a communication circuit 311 that is connected to the second antenna 302 and the second rectifier circuit 304 or a control circuit 307, and receives a wireless signal through the second antenna 302. The electronic device 102 may include a control circuit 307 operatively coupled to the communication circuit 311. The control circuit 307 may obtain, from the wireless signal, an identifier of an external electronic device 320 or electronic device, which is a target of the wireless signal. The control circuit 307 may determine whether or not the obtained identifier corresponds to or matches specified identifier information stored in the memory 130. The control circuit 307 may include a micro-controller unit (MCU). Alternatively, the control circuit 307 may include one or more large-scale integrations (LSIs).

The second rectifier circuit 304 may generate power required for the operation of the communication circuit 311 or the control circuit 307. The power generated by the second rectifier circuit 304 may be used for the operation of the communication circuit 311 or for obtaining and comparing the identifier of the wireless signal by the control circuit 307. The electromagnetic field in the loop of the second antenna 302 may be generated based on a wireless signal related to the second antenna 302 or the electronic device 102. In response to identifying the wireless signal from the electromagnetic field in the loop of the second antenna 302, the control circuit 307 may identify identification information or authentication information from the wireless signal. The identification information or authentication information is information indicating which electronic device is the target of the wireless signal, and may include, for example, an identifier of a specific electronic device.

The electronic device 102 may be controlled by the control circuit 307, and may include one or more switches 306 disposed on the first antenna 301. Referring to FIGS. 3A to 3B, the switch 306 may be disposed on the first antenna 301. The switch 306 may be disposed in an open portion of the first antenna 301. The switch 306 may be disposed in the conductive wire corresponding to the first antenna 301 so as to selectively connect the open portion thereof (both sides of the separated conductive wire). The switch 306 may include one or more transistors disposed in the open portion of the first antenna 301.

Since the switch 306 is disposed in the open portion of the first antenna 301, the structure of the first antenna 301 may switch between a closed loop structure and an open loop structure by the switch 306 or the control circuit 305 controlling the switch 306. Based on whether or not the wireless signal received through the second antenna 302 includes identification information including the identifier of the electronic device 102, the control circuit 307 may generate a control signal related to switching between the closed loop structure and the open loop structure of the first antenna 301.

For example, in response to identifying identification information including the identifier of the electronic device 102 from the wireless signal, the control circuit 307 may generate a control signal that switches the structure or electrical state of the first antenna 301 from the open loop structure to the closed loop structure. In response to reception of the control signal, the switch 306 may change the open loop structure of the first antenna 301 into the closed loop structure thereof. In response to the change of the first antenna to the closed loop structure, the first rectifier circuit 303 may generate a direct current signal to be used as power for electronic circuits or electronic components included in the electronic device 102.

The control circuit 307 may control electronic components or electronic circuits included in the electronic device 102. Referring to FIG. 3A, the electronic device 102 may include one or more electronic components controlled by the control circuit 307 (e.g., the light-emitting diode 305, the touch sensor 306, the speaker 310, and the like). Electronic components that may be included in the electronic device 102 are not limited to the aforementioned electronic components, and may be variously selected depending on a user experience (UX) to be provided to a user through the electronic device 102.

The control circuit 307 may obtain the wireless signal received through the second antenna 302. The control circuit 307 may control electronic components or electronic circuits included in the electronic device 102, based on the wireless signal received through the second antenna 302. The control circuit 307 may obtain power that is generated by the first rectifier circuit 303 and received through the first antenna 301. The control circuit 307 may supply the power received through the first antenna 301 to electronic components or electronic circuits included in the electronic device 102. In various embodiments, the power received through the first antenna 301 may be used for control of the control circuit 307 and electronic components (e.g., the LED 305, the touch sensor 306, the speaker 310, or the like), which are included in the electronic device 102 and related to the user experience, and the power received through the second antenna 302 may be used for authentication of the electronic device 102 in the communication circuit 311 and the control circuit 307 (e.g., authentication based on an identifier included in the wireless signal received through the second antenna 302).

The control circuit 307 may obtain a wireless signal or power from the electromagnetic field in the space adjacent to the electronic device 102, and may control electronic components or electronic circuits included in the electronic device 102, based on the obtained wireless signal or power. In response to the wireless signal including identification information or authentication information corresponding to the electronic device 102, the control circuit 307 may initiate control of electronic components or electronic circuits included in the electronic device 102.

Referring to FIGS. 3A to 3B, the electromagnetic field may be generated by the external electronic device 320 adjacent to the electronic device 102. The external electronic device 320 may include an antenna 321. The antenna 321 may be included in the antenna module 197 in FIG. 1. The antenna 321 may include a conductive wire disposed in a closed loop form.

The external electronic device 320 may include a communication circuit 322 connected to the antenna 321. The external electronic device 320 may control the communication circuit 322 in order to generate a wireless signal to be transmitted to the electronic device 102. The signal generated by the communication circuit 322 may be applied to the antenna 321, and the antenna 321 may generate an electromagnetic field in the space therearound. The electromagnetic field may include data included in the wireless signal and power necessary for the operation of the electronic device 102. If the electronic device 102 is located in the space adjacent to the antenna 321, or if the first antenna 301 and the second antenna 302 are located in the space adjacent to the antenna 321, a current induced by the electromagnetic field generated in the antenna 321 may flow through the first antenna 301 or the second antenna 302. Based on the electromagnetic field generated by the antenna 321, the electronic device 102 may wirelessly receive power from the external electronic device 320.

The external electronic device 320 may include a processor 323 that controls the communication circuit 322 to generate a wireless signal to be transmitted to the antenna 321. The external electronic device 320 may further include at least one of a memory 324 and a display 325. The processor 323 may be operatively coupled to the communication circuit 322, the memory 324, and the display 325. The processor 323 may execute one or more instructions stored in the memory 324, thereby outputting a user interface to the display 325, or may control the communication circuit 322, thereby outputting the wireless signal to the outside using the antenna 321. The processor 323 may add identification information or authentication information related to the electronic device 102 or the external electronic device 320 to the wireless signal.

According to various embodiments, the processor 323 may control the communication circuit 322 to output the wireless signal including identification information or authentication information related to the electronic device 102 or the external electronic device 320 to the outside. The antenna 321 connected to the communication circuit 322 may change the electromagnetic field in the space adjacent to the antenna 321, based on the wireless signal.

The external electronic device 320 and the electronic device 102 may be disposed adjacent to each other, or the first antenna 301 and the second antenna 302 of the electronic device 102 may be located in the space adjacent to the antenna 321. The second antenna 302 may have a closed loop structure, may be in an electrically connected state, or may have an electrical state corresponding to a closed circuit. The electrical states of the first antenna 301 and the second antenna 302 may be independent of each other. Induction of a current related to the electromagnetic field generated from the antenna 321 may occur in the second antenna 302. The magnitude of a current induced in the second antenna 302 may change in response to a change in the electromagnetic field by the antenna 321. The first antenna 301 may have an open loop structure, may be in an electrically disconnected state, or may have an electrical state corresponding to an open circuit. Despite a change in the electromagnetic field by the antenna 321, the induction of a current related to the electromagnetic field may not occur in the first antenna 301.

In response to the induction of a current, which is related to the electromagnetic field generated from the antenna 321, occurring in the second antenna 302, the second rectifier circuit 304 may generate power from the current induced in the second antenna 302. The communication circuit 311 or the control circuit 307 may receive the power generated in the second rectifier circuit 304. In response to reception of the power, the control circuit 307 may identify the wireless signal using the communication circuit 311. The control circuit 307 may control the switch 306, based on identification information or authentication information included in the wireless signal.

In response to identification of the wireless signal including identification information or authentication information related to the electronic device 102 or the external electronic device 320, the control circuit 307 or the second control circuit 305 may switch the first antenna 301 to the closed loop structure using the switch 306. For example, the second control circuit 305 may electrically connect the first antenna 301. The second control circuit 305 may switch the first antenna 301 to an electrical state corresponding to the closed circuit.

In the state in which the first antenna 301 is electrically connected, induction of a current related to the electromagnetic field may occur in the first antenna 301. In response to the induction of a current related to the electromagnetic field occurring in the first antenna 301, the first rectifier circuit 303 may generate power from the current induced in the first antenna 301. The power generated in the first rectifier circuit 303 may be supplied to the control circuit 307 and one or more electronic components connected to the control circuit 307 (the light-emitting diode 308, the touch sensor 309, the speaker 310, or the like). In the state in which the first antenna 301 is electrically connected, the electronic device 102 may wirelessly receive power from the external electronic device 320 using the first antenna 301.

The electronic components that are connected to the control circuit 307 and receive the power generated in the first rectifier circuit 303 are not limited to the examples in FIGS. 3A to 3B. For example, the electronic device 102 may further include a display (not shown) connected to the control circuit 307 and operated by the power, or may further include a sensor (not shown) for pen input, which is connected to the control circuit 307 and operated by the power.

In response to reception of the power generated in the first rectifier circuit 303, the control circuit 307 may control one or more electronic components connected to the control circuit 307, based on the wireless signal identified using the second antenna 302. For example, the control circuit 307 may change the time at which the power generated in the first rectifier circuit 303 is supplied to the LED 308, based on the wireless signal identified using the second antenna 302. For example, the control circuit 307 may supply the power generated in the first rectifier circuit 303 to the touch sensor 309. If a user input is obtained from the touch sensor 309, the main control circuit 307 may output the obtained user input to the external electronic device 320 through the second antenna 302. For example, the main control circuit 307 may control the speaker 310 that receives the power of the first rectifier circuit 303 such that the speaker 310 outputs voice information included in the wireless signal identified using the second antenna 302.

Referring to FIG. 3B, an electronic device 102 according to various embodiments may include a communication circuit 311 that is connected to the second antenna 302 or the second rectifier circuit 304 and receives a wireless signal through the second antenna 302. The communication circuit 311 may transmit the wireless signal received through the second antenna 302 to a second control circuit 305. The electronic device 102 may include a second control circuit 305 that controls the switch 306, based on the wireless signal received through the second antenna 302. The second antenna 302, the second rectifier circuit 304, and the second control circuit 305 may be included in a single integrated circuit (e.g., an NFC IC).

The second control circuit 305 may obtain an identifier of the external electronic device 320 or the electronic device 102, which is the target of the wireless signal, from the wireless signal. The second control circuit 305 may identify the identifier, and may determine whether or not the identifier corresponds to or matches specified identifier information stored in the memory 130. If the identifier obtained from the wireless signal corresponds to the identifier of the external electronic device 320 or the electronic device 102, the second control circuit 305 may inform the first control circuit 305 of the reception of the wireless signal including the identifier. If the identifier obtained from the wireless signal corresponds to the identifier of the external electronic device 320 or the electronic device 102, the second control circuit 305 may transmit at least a portion of the received wireless signal to the first control circuit 307. For example, the second control circuit 305 may transmit, to the first control circuit 307, information for controlling one or more electronic components (the LED 308, the touch sensor 309, the speaker 310, or the like) connected to the first control circuit 307 among the received wireless signal. The second control circuit 305 may include a micro-controller unit (MCU). Alternatively, the second control circuit 305 may include one or more large-scale integrations (LSIs). The second rectifier circuit 304 may generate power necessary for the operation of the second control circuit 305, similarly to the description in FIG. 3A. In response to identifying the wireless signal from the electromagnetic field in the loop of the second antenna 302 using the communication circuit 311, the second control circuit 305 may identify identification information or authentication information from the wireless signal. The identification information or authentication information is information indicating which electronic device is the target of the wireless signal, and may include, for example, an identifier of a specific electronic device.

Since the switch 306 is disposed in the open portion of the first antenna 301, the structure of the first antenna 301 may switch between the closed loop structure and the open loop structure by the switch 306 or the second control circuit 305 controlling the switch 306. Based on whether or not the wireless signal received through the second antenna 302 includes the identifier of the electronic device 102 or the identifier of the external electronic device 320, the second control circuit 305 may generate a control signal related to switching between the closed loop structure and the open loop structure of the first antenna 301.

For example, in response to identifying the identifier of the electronic device 102 or the identifier of the external electronic device 320 from the wireless signal, the second control circuit 305 may generate a control signal that switches the structure or electrical state of the first antenna 301 from the open loop structure to the closed loop structure. In response to reception of the control signal, the switch 306 may change the open loop structure of the first antenna 301 into the closed loop structure thereof. In response to the change of the first antenna into the closed loop structure, the first rectifier circuit 303 may generate a direct current signal to be used as power for electronic circuits or electronic components included in the electronic device 102.

The electronic device 102 may include a first control circuit 307 that controls electronic components or electronic circuits included in the electronic device 102. The first control circuit 307 may include a micro-controller unit (MCU). Alternatively, the first control circuit 307 may include one or more large-scale integrations (LSIs). Referring to FIG. 3B, one or more electronic components included in the electronic device 102 (e.g., the LED 305, the touch sensor 306, the speaker 310, or the like) may be controlled by the first control circuit 307. The electronic components that may be included in the electronic device 102 are not limited to the aforementioned electronic components, and may be variously selected depending on a user experience (UX) to be provided to a user through the electronic device 102.

The first control circuit 307 may obtain the wireless signal, which is identified by the second control circuit 305 and received through the second antenna 302. The first control circuit 307 and the second control circuit 305 may be disposed on a single PCB, or may be included in a single MCU. The second control circuit 305 may be included in the first control circuit 307. The first control circuit 307 may control the electronic components or electronic circuits included in the electronic device 102, based on the wireless signal received through the second antenna 302. The first control circuit 307 may be generated by the first rectifier circuit 303, and may obtain the power received through the first antenna 301. The first control circuit 307 may supply the power received through the first antenna 301 to the electronic components or electronic circuits included in the electronic device 102.

The first control circuit 307 may obtain a wireless signal or the power from the electromagnetic field in the space adjacent to the electronic device 102, and may control the electronic components or electronic circuits included in the electronic device 102, based on the obtained wireless signal or power. In response to the wireless signal including identification information or authentication information corresponding to the electronic device 102 or the external electronic device 320, the first control circuit 307 may initiate control of the electronic components or electronic circuits included in the electronic device 102.

The electromagnetic field may be generated by the external electronic device 320 adjacent to the electronic device 102. The external electronic device 320 in FIG. 3B may correspond to the external electronic device 320 in FIG. 3A. The operation of the external electronic device 320 in FIG. 3B may be performed based on the description made in FIG. 3A.

In response to induction of a current, which is related to the electromagnetic field generated from the antenna 321, occurring in the second antenna 302, the second rectifier circuit 304 may generate power from the current induced in the second antenna 302. The second control circuit 305 may receive the power generated in the second rectifier circuit 304. In response to reception of the power, the second control circuit 305 may identify the wireless signal using the communication circuit 311. The second control circuit 305 may control the switch 306, based on the identification information or authentication information included in the wireless signal.

In response to identification of the wireless signal including the identification information or authentication information related to the electronic device 102 or the external electronic device 320, the second control circuit 305 may switch the first antenna 301 to the closed loop structure using the switch 306. The second control circuit 305 may electrically connect the first antenna 301. The second control circuit 305 may switch the first antenna 301 to an electrical state corresponding to the closed circuit.

In the state in which the first antenna 301 is electrically connected, induction of a current related to the electromagnetic field may occur in the first antenna 301. In response to the induction of a current related to the electromagnetic field occurring in the first antenna 301, the first rectifier circuit 303 may generate power from the current induced in the first antenna 301. The power generated in the first rectifier circuit 303 may be supplied to the first control circuit 307 and one or more electronic components connected to the first control circuit 307 (the LED 308, the touch sensor 309, the speaker 310, or the like). In the state in which the first antenna 301 is electrically connected, the electronic device 102 may wirelessly receive power from the external electronic device 320 using the first antenna 301.

The electronic components connected to the first control circuit 307 and receiving the power generated in the first rectifier circuit 303 are not limited to the examples shown in FIG. 3B. For example, the electronic device 102 may further include a display (not shown) connected to the first control circuit 307 and operated by the power, or may further include a sensor (not shown) for pen input, which is connected to the first control circuit 307 and operated by the power.

In response to reception of the power generated in the first rectifier circuit 303, the first control circuit 307 may control one or more electronic components connected to the first control circuit 307, based on the wireless signal identified using the second antenna 302. For example, the first control circuit 307 may change the time at which the power generated in the first rectifier circuit 303 is supplied to the LED 308, based on the wireless signal identified using the second antenna 302. For example, the first control circuit 307 may supply the power generated in the first rectifier circuit 303 to the touch sensor 309. If a user input is obtained from the touch sensor 309, the first control circuit 307 may output the obtained user input to the external electronic device 320 through the second antenna 302. For example, the first control circuit 307 may control the speaker 310 that receives the power of the first rectifier circuit 303 such that the speaker 310 outputs voice information included in the wireless signal identified using the second antenna 302.

According to various embodiments, based on the wireless signal identified using the second antenna 302, the first control circuit 307 may switch the first antenna 301 to the closed loop structure using the switch 306. For example, the first control circuit 307 may obtain identification information or authentication information from the wireless signal received through the second antenna 302. The second control circuit 305 may directly obtain the identification information or authentication information from the wireless signal received by the second antenna 302, which is transmitted through the communication circuit 311, or may receive the identification information or authentication information obtained by the first control circuit 307. The second control circuit 305 may control the switch 306, based on the identification information or authentication information.

Figure 4:
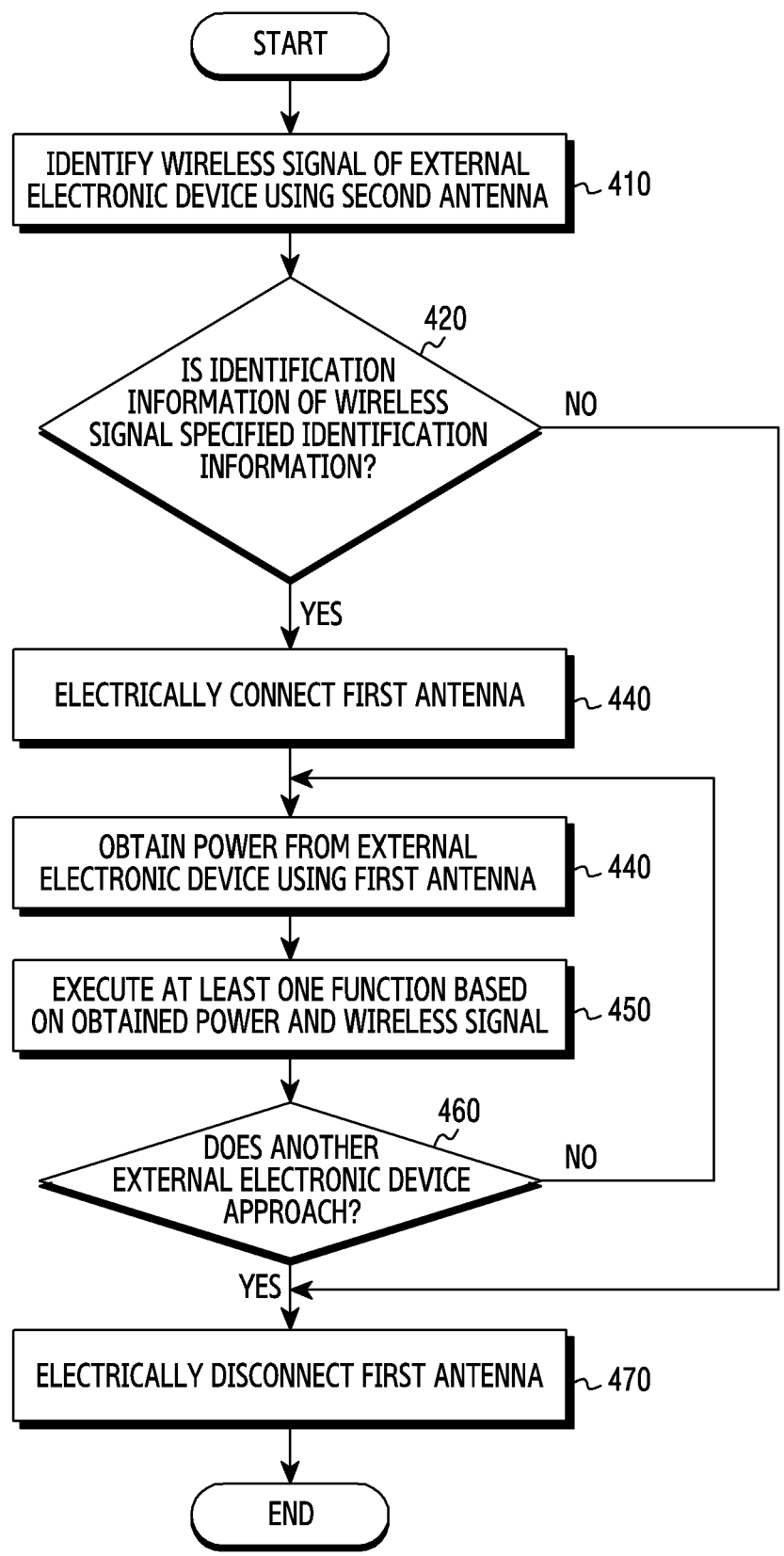
FIG. 4 is a flowchart illustrating an operation performed by an electronic device according to various embodiments.

FIG. 4 is a flowchart illustrating an operation performed by an electronic device according to various embodiments. The electronic device in FIG. 4 may correspond to the electronic device 102 in FIGS. 3A to 3B or the electronic device 102 in FIG. 1. The operation described in FIG. 4 may be performed by various control circuits included in the electronic device 102 in FIGS. 3A to 3B (e.g., the first control circuit 307 or the second control circuit 305). The electronic device may include a first antenna in the shape of a loop and a second antenna having a smaller loop than the first antenna. The first antenna and the second antenna may correspond to the first antenna 301 and the second antenna 302 in FIGS. 3A to 3B, respectively.

Referring to FIG. 4, in operation 410, the electronic device may identify a wireless signal of the external electronic device that is distinguished from the electronic device (e.g., the external electronic device 320 in FIGS. 3A to 3B) using the second antenna having a smaller loop. The wireless signal may be identified from the current or voltage induced in the second antenna. The power required in order for the electronic device to identify the wireless signal may be obtained from the current or voltage induced in the second antenna. Referring to FIG. 4, in operation 420, in response to identification of the wireless signal of the external electronic device, the electronic device may determine whether or not identification information of the wireless signal is specified identification information. The specified identification information may include, for example, identification information or authentication information related to the electronic device or the external electronic device. The identification information may include one or more values that are exclusively assigned to the electronic device or the external electronic device (e.g., an identifier of the electronic device, an MAC address, and the like). The authentication information may include one or more values for temporarily determining the relevance of the wireless signal and the electronic device {e.g., a PIN value, a one-time password (OTP) value, and the like}. In operation 420, if the identification information of the wireless signal is not the specified identification information, the electronic device may electrically disconnect the first antenna, based on operation 470. Referring to FIG. 4, in operation 430, if the identification information of the wireless signal is the specified identification information, the electronic device may electrically connect the first antenna using a switch related to the first antenna. The switch may selectively open or connect the first antenna. The switch may be disposed in an open portion of the first antenna. Electrically connecting the first antenna may denote that the open portion is electrically connected so that the first antenna has a closed loop structure or so that the first antenna has an electrical state corresponding to a closed circuit. As the first antenna is electrically connected, a voltage or a current may be induced in the first antenna by an electromagnetic field.

Referring to FIG. 4, in operation 440, the electronic device may obtain power from the external electronic device using the first antenna. The power may be obtained from the voltage or current induced in the first antenna.

Referring to FIG. 4, in operation 450, the electronic device may execute at least one function, based on the obtained power and the identified wireless signal. The function may include at least one of operating an LED included in the electronic device, identifying a user's gesture using a touch sensor included in the electronic device, outputting a sound signal using a speaker included in the electronic device, and wireless communication between the external electronic device and the electronic device.

Referring to FIG. 4, in the operation 460, while executing the at least one function, the electronic device may identify whether or not another external electronic device, which is distinguished from the external electronic device, approaches. For example, the electronic device may identify a change in the electromagnetic field in the space adjacent to the electronic device using the second antenna, and may detect the approach of another external electronic device, based on the identified change in the electromagnetic field. For example, the external electronic device may transmit, to the electronic device, a wireless signal informing of the approach of another external electronic device.

If no another external electronic device approaches, the electronic device may obtain power from the external electronic device using the first antenna, and may continue to perform the operation of obtaining power or a wireless signal from the external electronic device using the second antenna. The power obtained from the second antenna may be used to operate some hardware elements of the electronic device (e.g., the second control circuit 305 in FIG. 3B).

Referring to FIG. 4, if another external electronic device approaches, the electronic device may electrically disconnect the first antenna using the switch related to the first antenna in operation 470. Electrically disconnecting the first antenna may denote that the closed portion is electrically opened by the switch so that the first antenna has an open loop structure or so that the first antenna has an electrical state corresponding to the open circuit.

As the first antenna is electrically disconnected, the induction of the voltage or current in the first antenna by means of the electromagnetic field may be stopped. If the induction of the voltage or current in the first antenna by means of the electromagnetic field is stopped, obtaining power from the external electronic device using the first antenna may be stopped. If obtaining power from the external electronic device using the first antenna is stopped, the execution of at least one function by the electronic device in relation to operation 450 may be stopped.

Figure 5A:
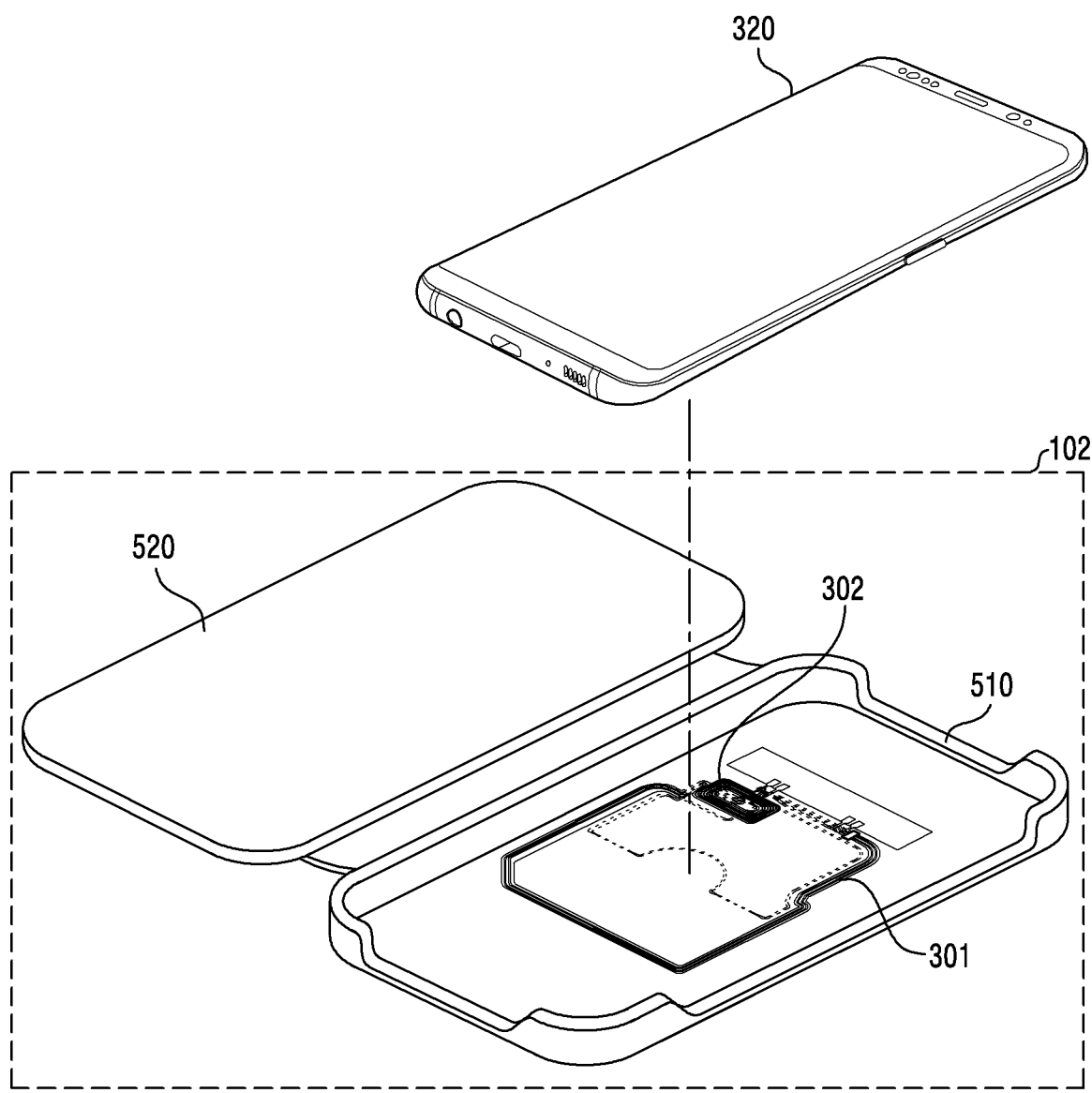
FIGS. 5A to 5B are exemplary diagrams illustrating an operation performed by an electronic device in response to approaches of an external electronic device and another external electronic device according to various embodiments.
Figure 5B:
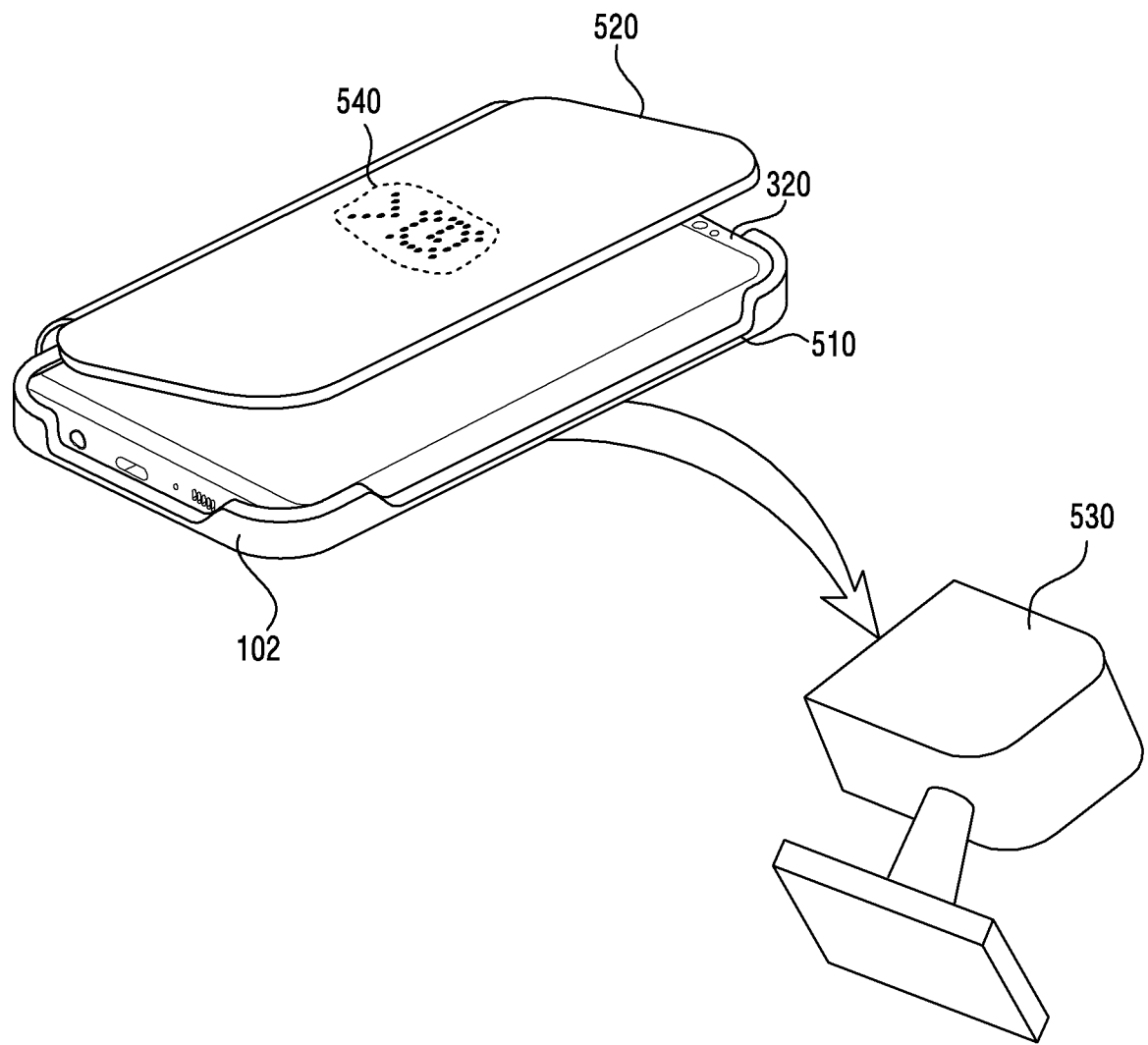

FIGS. 5A to 5B are exemplary diagrams illustrating an operation performed by an electronic device 102 in response to approaches of an external electronic device 320 and another external electronic device 530 according to various embodiments. The electronic device 102 in FIGS. 5A to 5B may correspond to the electronic devices in FIGS. 1 and 3A to 3B. The external electronic device 320 in FIGS. 5A to 5B may correspond to the external electronic device 320 in FIGS. 3A to 3B and the external electronic device 320 in FIG. 4. Another external electronic device 530 in FIGS. 5A to 5B may correspond to another external electronic device in FIG. 4.

The electronic device 102 may be attachable to and detachable from the external electronic device 320. Referring to FIG. 5A, the electronic device 102 may include a housing 510 in the form to be attached to and detached from the external electronic device 320. The housing 510 may have a form corresponding to the housing of the external electronic device 320. The back face of the housing 510 may come into contact with the back face of the external electronic device 320, and the side face of the housing 510 may have a form for protecting the side face of the external electronic device 320. At least a portion of the side face of the housing 510 may be open. The housing 510 may include a cover 520 for protecting the front face or the display of the external electronic device 320. The housing 510 may include a space for embracing the external electronic device 320. According to some embodiments, the electronic device 102 may further include a cover 520 that is connected to the housing 510 using a connecting part (e.g., including a hinge or fabric). The cover 520 may be connected to the housing 510 so as to cover the open portion of the housing 510 or the display of the external electronic device 320. The user may put the external electronic device 320 into the electronic device 102 using the cover 520 and the housing 510. The open portion of the housing 510 may correspond to the position of the display of the external electronic device 320. While the external electronic device 320 is embraced in the space, the housing 510 and the cover 520 may protect the external electronic device 320 from the external impact.

The position of the first antenna 301 or second antenna 302 of the electronic device 102 may be related to the direction of the external electronic device 320 embraced in the space or the position of the antenna included in the external electronic device 320 (e.g., the antenna 321 in FIGS. 3A to 3B) in the space. For example, if the antenna included in the external electronic device 320 (e.g., the antenna 321 in FIGS. 3A to 3B) is disposed on the back face of the external electronic device 320, the first antenna 301 and the second antenna 302 may be disposed in the portion adjacent to the back face of the external electronic device 320 in the housing 510. While the external electronic device 320 is embraced in the space of the housing 510, the electromagnetic field generated by the external electronic device 320 may affect the first antenna 301 and the second antenna 302.

Referring to FIG. 5B, the electronic device 102 may include a display 540 (e.g., the LED 308) for outputting or relaying information provided from the external electronic device 320 to the user while the external electronic device 320 is embraced in the housing 510. The display 540 may include a plurality of LEDs. While the external electronic device 320 is attached to the electronic device 102 or is embraced in the housing 510, the electronic device 102 may obtain power from the external electronic device 320. The power may be obtained based on a wireless signal transmitted from the external electronic device 320 and including an identifier of the electronic device 102. The wireless signal may be a wireless signal based on an NFC technology. The electronic device 102 may obtain power, which is output from the external electronic device 320, from the wireless signal, based on operations 410 to 440 in FIG. 4. The power may be obtained by the first antenna 301 that is relatively large. The obtained power may be supplied to electronic components of the electronic device 510, such as the display 540.

The electronic device 102 may control the electronic components of the electronic device 102, such as the display 540, based on the wireless signal including the identifier of the external electronic device 320 or the electronic device 102. The electronic device 102 may control the electronic components of the electronic device 102, based on operation 450 in FIG. 4. For example, in addition to the identifier of the external electronic device 320 or the electronic device 102, the wireless signal may include information to be output through the display 540 (e.g., the current time, notification of received messages, missed calls, battery capacity, Wi-Fi connection, and the like). The electronic device 102 may obtain power necessary for the operation of the display 540 using the first antenna 301. While the information is being output through the display 540, the user may identify the information without moving the cover 520 or taking out the external electronic device 320 from the housing 510.

While the external electronic device 320 is embraced in the housing 510 of the electronic device 102, the user may use another external electronic device 530 that utilizes the same type of wireless communication as the wireless communication between the electronic device 102 and the external electronic device 320 (e.g., wireless communication to which an NFC technology is applied). Another external electronic device 530 may include an antenna (not shown) for communication with the external electronic device 320. For example, the user may use a payment service using the wireless communication between the external electronic device 320 and another external electronic device 530. For example, another external electronic device 530 may be a terminal of point-of-sales (POS) related to the payment service.

Referring to FIG. 5B, the user may move the external electronic device 320 and the electronic device 102 embracing the external electronic device 320 to approach another external electronic device 530, or may bring the electronic device 102 into physical contact with another external electronic device 530 (e.g., tapping), thereby causing wireless communication between the external electronic device 320 and another external electronic device 530. While controlling the electronic components of the electronic device 102, based on the wireless signal including the identifier of the electronic device 102, the electronic device 102 may detect an approach of another external electronic device 530, based on operation 460. In some embodiments, the first antenna 301 of the electronic device 102 may switch from a closed loop structure to an open loop structure under the control of the external electronic device 320. In response to identification of another external electronic device 530, the external electronic device 320 may not transmit a wireless signal related to control of the electronic components or the switch 306 included in the electronic device 102, or may not transmit identification information related thereto. If transmission of the wireless signal or identification information from the external electronic device 320 is stopped, the electronic device 102 may switch the first antenna 301 from the closed loop structure to the open loop structure.

While the external electronic device 320 is embraced in the housing 510 of the electronic device 102, the first antenna 301 or the second antenna 302 of the electronic device 102 may get close to the antenna included in the external electronic device 320 (e.g., the antenna 321 in FIGS. 3A to 3B). If the external electronic device 320 and the electronic device 102 approach another external electronic device 530, the first antenna 301 or the second antenna 302 may be located between the antenna of the external electronic device 320 and the antenna of another external electronic device 530.

Figure 6:
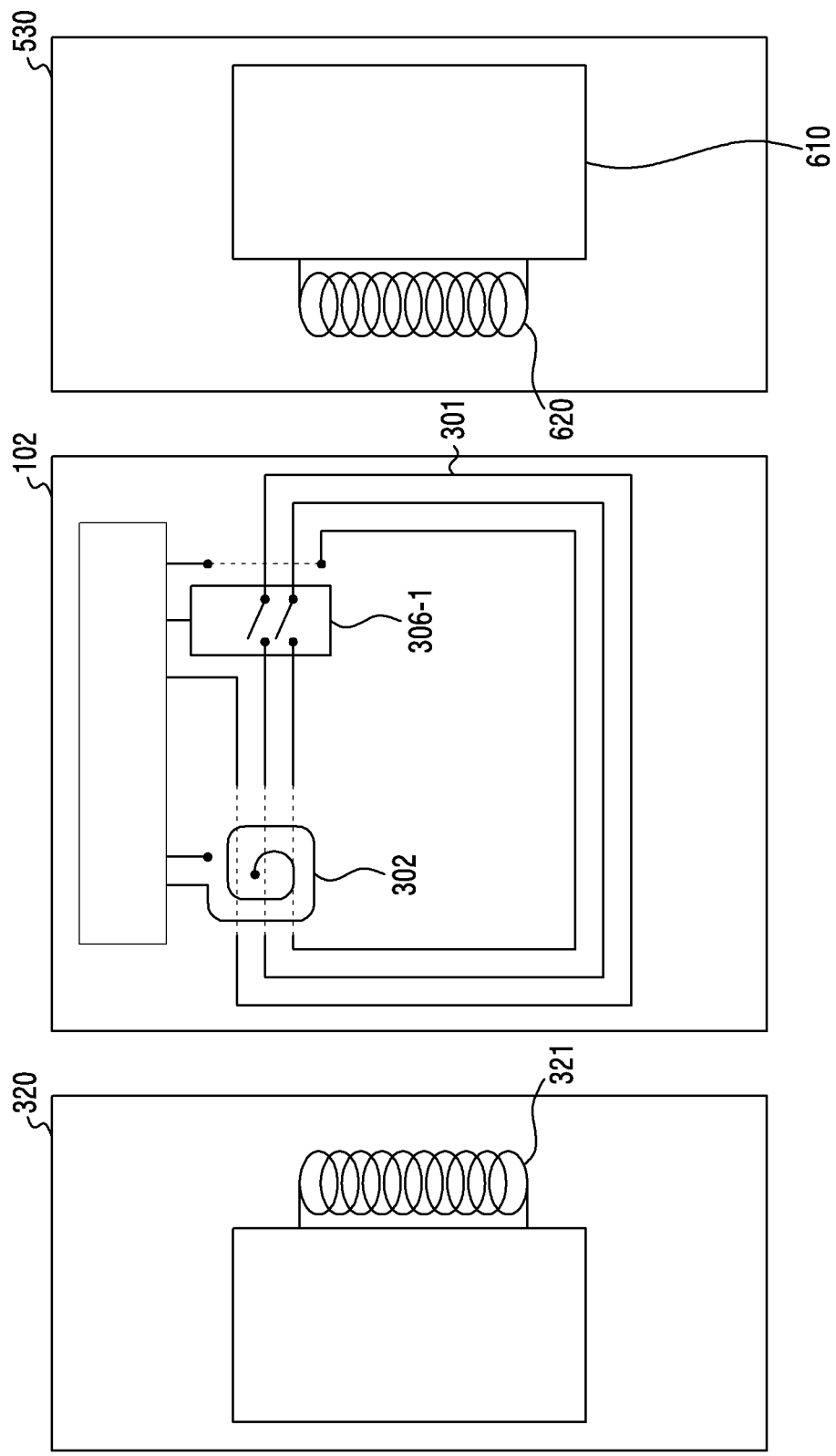
FIG. 6 is a diagram illustrating, in the case where a user causes the external electronic device and the electronic device shown in FIG. 5B to approach another external electronic device, positions and states of antennas of the electronic devices.

FIG. 6 is a diagram illustrating, in the case where a user causes the external electronic device 320 and the electronic device 102 in FIG. 5B to approach another external electronic device 530, positions and states of antennas of the electronic devices. For convenience of description, some elements may be omitted from the drawing.

Referring to FIG. 6, as a user causes the external electronic device 320 and the electronic device 102 to approach another external electronic device 530, an antenna 321 of the external electronic device 320, a first antenna 301 of the electronic device 102, and an antenna 620 of another external electronic device 530 may be arranged in sequence in the space. Another external electronic device 530 may include an antenna 620 and an electronic circuit 610 performing wireless communication using the antenna 620.

While performing the wireless communication between the external electronic device 320 and another external electronic device 530, the first antenna 301, which is disposed between the external electronic device 320 and another external electronic device 530 and is electrically connected thereto, may interfere with the wireless communication between the external electronic device 320 and another external electronic device 530. For example, the first antenna 301 in a closed loop structure may change the resonance frequency (e.g., may reduce the resonance frequency) of the electromagnetic field between the external electronic device 320 and another external electronic device 530, or may absorb or store at least some of the power of the signal output from the external electronic device 320 or another external electronic device 530 to attenuate the strength of an output signal of the electromagnetic field, thereby interfering with the wireless communication between the external electronic device 320 and another external electronic device 530.

In response to the approach of another external electronic device 530, the electronic device 102 may change the first antenna 301 into an open circuit, based on operation 470. Referring to FIG. 6, the electronic device 102 may switch the electrical state of the first antenna 301 using a switch 306-1 disposed in an open portion of the loop of the first antenna 301. For example, in response to the approach of another external electronic device 530, the electrical state of the first antenna 301 may switch to an electrical state corresponding to an open circuit. The switch 306-1 may include a plurality of transistors. Referring to FIG. 6, the number of transistors may correspond to the number of loops of the first antenna 301. The plurality of transistors may be disposed on the open portions of the plurality of loops of the first antenna 301, respectively.

While the first antenna 301 has the open circuit or the open loop structure, induction of a current related to the electromagnetic field between the external electronic device 320 and another external electronic device 530 may not occur in the first antenna 301. Alternatively, the magnitude of a current induced in the first antenna 301 by another external electronic device 530 may be smaller than that when the first antenna 301 is in the closed loop structure. Since the induction of a current related to the electromagnetic field does not occur in the first antenna 301, the first antenna 301 in the open loop structure may have the resonance band characteristics in a band different from the resonance frequency related to the wireless signal output from the external electronic device 320 and another external electronic device 530, or may not induce a current by the wireless signal output from the external electronic device 320 and another external electronic devices 530 or minimize the induction thereof, thereby preventing or minimizing a change in the waveform of the electromagnetic field between the external electronic device 320 and another external electronic device 530. The first antenna 301 may not interfere with the wireless communication between the external electronic device 320 and another external electronic device 530. The electronic device 102 may prevent distortion of the wireless communication between the external electronic device 320 and another external electronic device 530 caused due to the first antenna 301 by electrically disconnecting the first antenna 301.

Figure 7:
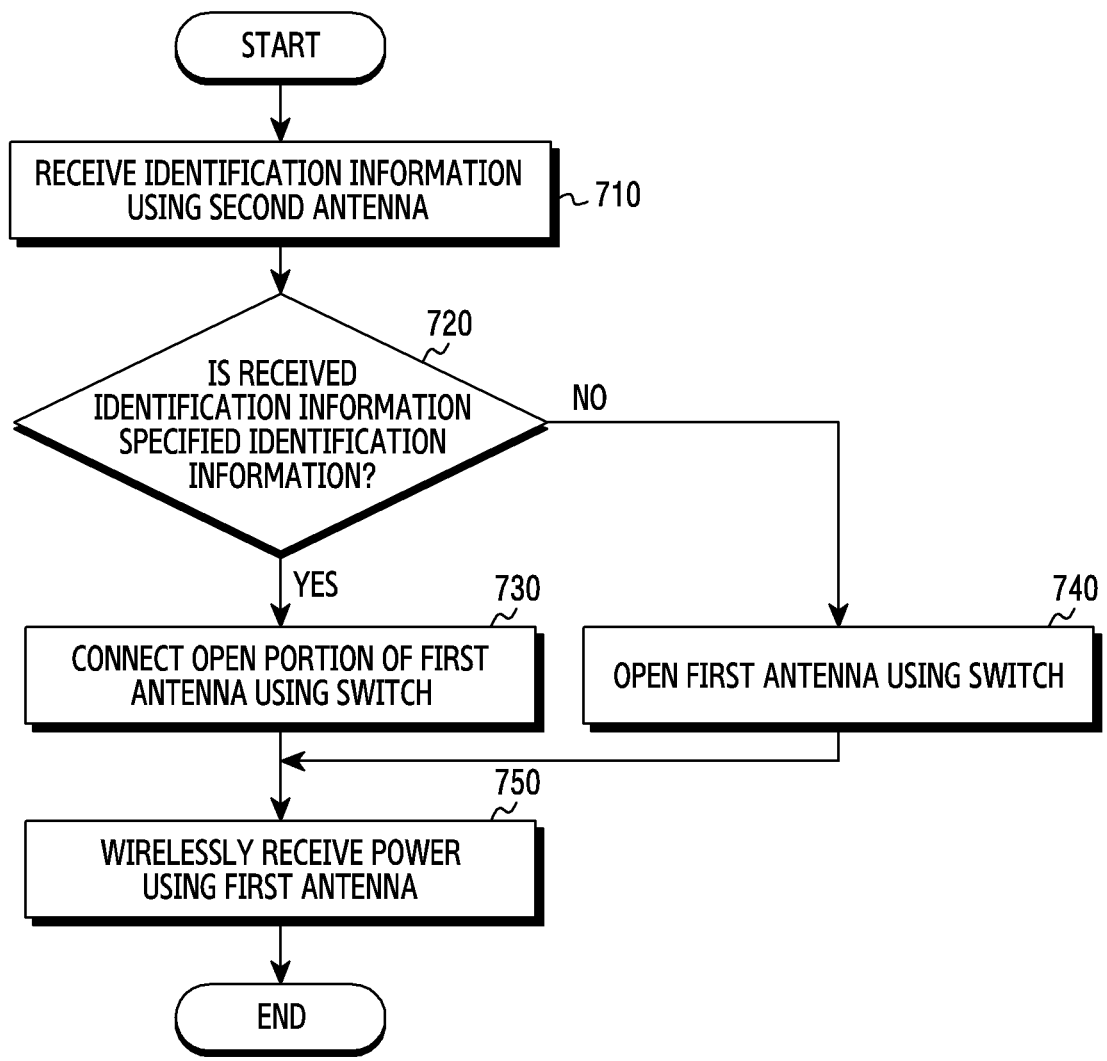
FIG. 7 is a flowchart illustrating an operation in which an electronic device controls a switch for selectively opening or connecting a first antenna according to various embodiments.

FIG. 7 is a flowchart illustrating an operation in which an electronic device controls a switch for selectively opening or connecting a first antenna according to various embodiments. The electronic device in FIG. 7 may correspond to the electronic devices 102 in FIG. 1 to FIGS. 3A to 3B. The first antenna and the second antenna in FIG. 7 may correspond to the first antenna 301 and the second antenna 302 in FIGS. 3A to 3B, respectively. The switch in FIG. 7 may correspond to the switch 306 in FIGS. 3A to 3B. The operation in FIG. 7 may be performed by a control circuit of the electronic device (e.g., the control circuit 305 in FIG. 3A or the second control circuit 307 in FIG. 3B).

Referring to FIG. 7, in operation 710, the control circuit may receive identification information of an external electronic device, which is distinguished from the electronic device, using the second antenna. The external electronic device may correspond to the external electronic device 320 in FIGS. 3A to 3B. The external electronic device may change the electromagnetic field in the space adjacent to the external electronic device using the antenna included in the external electronic device, thereby outputting a wireless signal including the identification information to the space. The second antenna of the electronic device may be located in the space adjacent to the external electronic device. In response to a change in the electromagnetic field in the space adjacent to the second antenna, the control circuit may identify the wireless signal.

The identification information may include identification information of the external electronic device or the electronic device, or may include information required to establish a connection between the external electronic device and the electronic device. The identification information may include information required to switch the electrical state of the first antenna from an open state to a closed state. A current induced in the second antenna according to the change in the electromagnetic field may be used both in identification of the wireless signal and in the operation of the control circuit as power. In response to the identification of the wireless signal, the control circuit may obtain or receive the identification information included in the identified wireless signal.

Referring to FIG. 7, in operation 720, the control circuit may determine whether or not the received identification information is specified identification information. The specified identification information may be, for example, at least one of an identifier exclusively assigned to the electronic device, a call identifier of an authentication circuit included in the electronic device, and an identifier assigned to the control circuit. Operations 710 to 720 may be performed every specified period.

If the received identification information is the specified identification information, the control circuit may connect an open portion of the first antenna using a switch in operation 730. The switch controlled by the control circuit may be disposed in the open portion of the first antenna. The control circuit may close the switch so that the open portion of the first antenna may be electrically connected by the switch. The structure of the first antenna may switch from an open loop structure to a closed loop structure by the switch. The electrical state of the first antenna may switch from the electrical state corresponding to an open circuit to the electrical state corresponding to a closed circuit.

As the electrical state of the first antenna switches to the electrical state corresponding to the closed circuit, the first antenna may output the current induced by the electromagnetic field in the space adjacent thereto. Referring to operation 750, the electronic device may wirelessly receive power using the first antenna. The current output from the first antenna may be changed to the power having a specified magnitude of voltage or current by a rectifier circuit (e.g., the first rectifier circuit 303 in FIGS. 3A to 3B). The power may be supplied to one or more electronic components included in the electronic device.

If the received identification information is not the specified identification information, the control circuit may open the first antenna using the switch in operation 740. For example, the control circuit may open the switch disposed in the open portion of the first antenna, thereby switching the structure of the first antenna from the closed loop structure to the open loop structure. The electrical state of the first antenna may switch from the electrical state corresponding to the closed circuit to the electrical state corresponding to the open circuit.

As the electrical state of the first antenna switches to the electrical state corresponding to the open circuit, a current may not be induced in the first antenna despite a change in the electromagnetic field in the space adjacent to the first antenna. Since the current is not induced in the first antenna, the operation of converting the current output from the first antenna into power and the operation of supplying power to one or more electronic components included in the electronic device may be stopped.

Figure 8A:
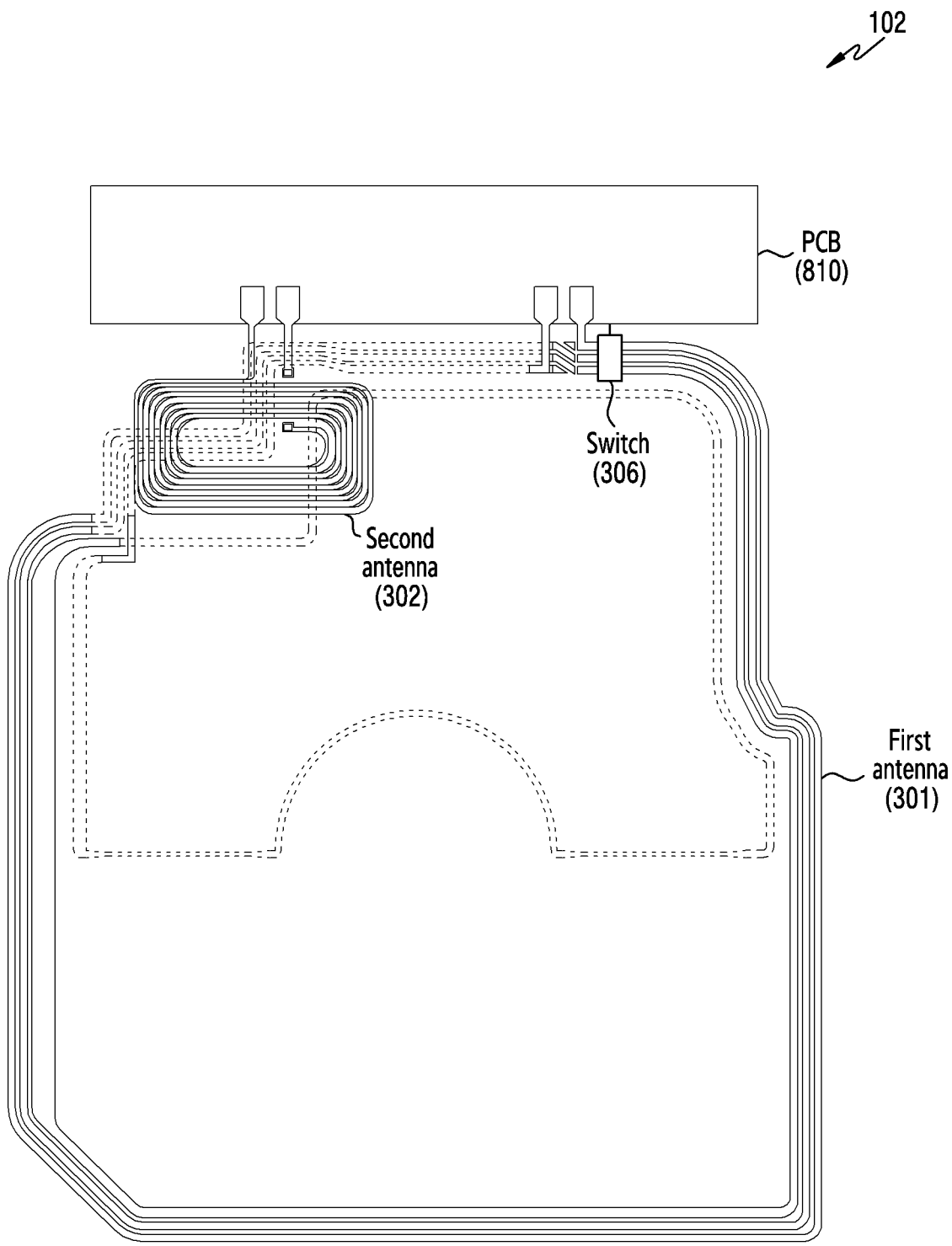
FIGS. 8A to 8C are exemplary diagrams illustrating structures of a switch control circuit, a switch, and a first antenna of an electronic device according to various embodiments.
Figure 8B:
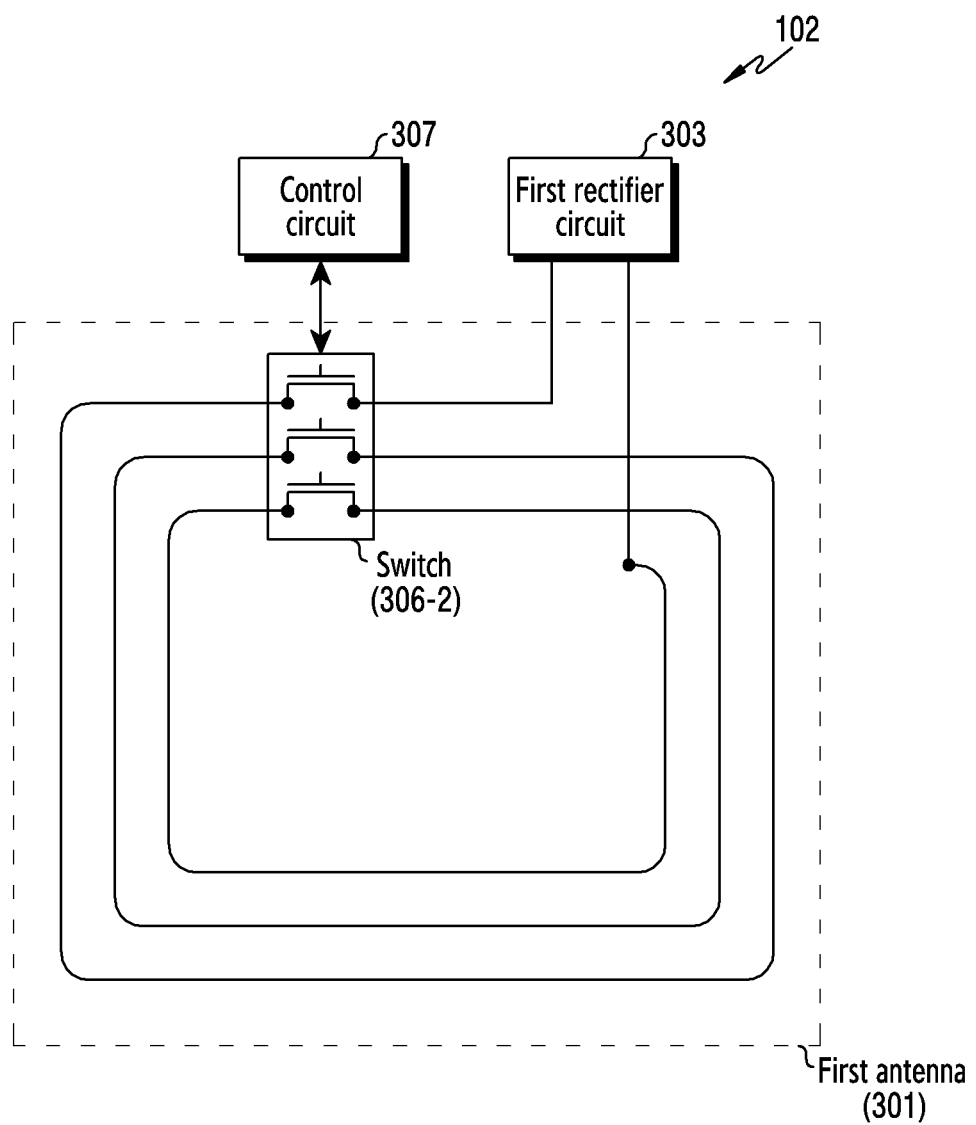
Figure 8C:
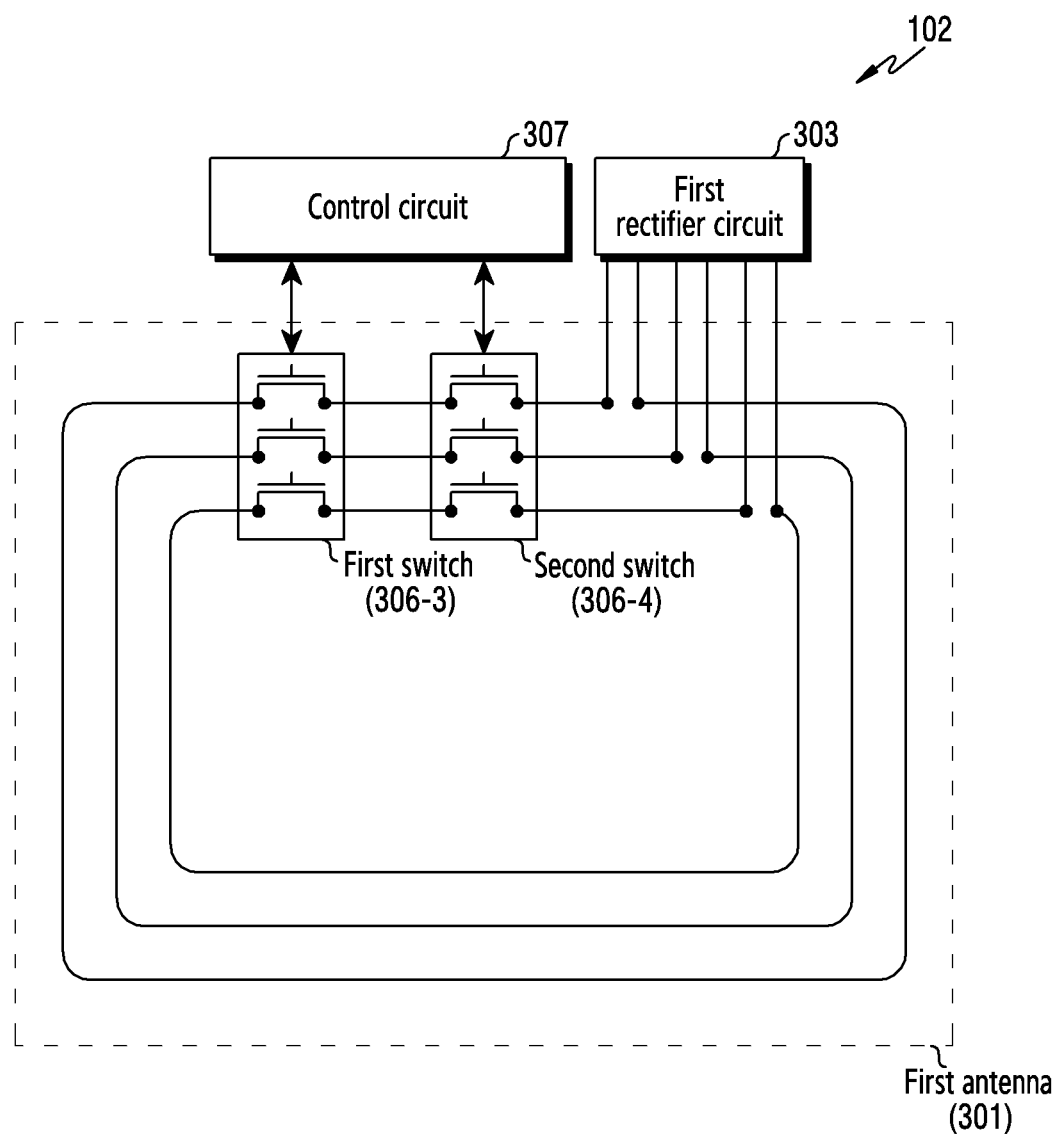

FIGS. 8A to 8C are exemplary diagrams illustrating structures of a control circuit 305, a switch 306, and a first antenna 301 of an electronic device 102 according to various embodiments. For convenience of description, some elements thereof may be omitted or illustrated. The control circuit 305 in FIGS. 8A to 8C may correspond to the control circuit 305 in FIG. 3A or the second control circuit 307 in FIG. 3B. The electronic device 102 in FIGS. 8A to 8B may correspond to the electronic devices 102 in FIGS. 1, 3A to 3B, 5A to 5B, and 6.

Referring to FIG. 8A, the structures of a first antenna 301, a second antenna 302, a switch 306, and a printed circuit board (PCB) 810 included in the electronic device 102 according to an embodiment are schematically shown. Various electronic components of the electronic device 102 (e.g., the second control circuit 305, the first rectifier circuit 303, the second rectifier circuit 304, the control circuit 307, and the like in FIGS. 3A to 3B) may be disposed on the PCB 810.

According to various embodiments, a first antenna pattern 301, a second antenna pattern 302, or a switch 306 may be disposed on the PCB. For example, at least a portion of the first antenna 301 and the switch 306 may be disposed on the PCB.

Referring to FIG. 8A, the first antenna 301 and the second antenna 302 may be disposed to at least partially overlap each other. The size of the loop of the first antenna 301 may be greater than the size of the loop of the second antenna 302. The second antenna 302 may have a plurality of loops that are always closed. The electronic device 102 may have other antennas in addition to the first antenna 301 and the second antenna 302, and the first antenna 301, the second antenna 302, and other antennas may at least partially overlap each other in the housing of the electronic device 102. The first antenna 301 may be selectively opened or closed using the switch 306 included in at least a portion of the plurality of loops. If the first antenna 301 includes a plurality of loops, one or more switches 306 may be disposed in each of the plurality of loops in order to selectively open or close each of the plurality of loops. The electronic device 102 may control the switch 306, based on a wireless signal received using the second antenna 302, thereby simultaneously opening or closing the plurality of loops. According to various embodiments, at least one of the loops constituting the first antenna 301 or the second antenna 302 may have a different shape from other loops.

FIGS. 8B to 8C are exemplary diagrams illustrating the structure of the switch 306 for opening or closing each of the plurality of loops of the first antenna 301. The switch 306 may include one or more transistors, and the number of transistors may be an integer multiple of the number of loops of the first antenna 301.

Referring to FIG. 8B, the first antenna 301 may have three loops that are formed by winding a conductive wire. A switch 306-2 may have three transistors corresponding to the number of loops of the first antenna 301. The three transistors may be disposed in three loops of the first antenna 301, respectively, and may open or close each of the three loops, based on a control signal from the control circuit 305.

For example, if the control circuit 305 identifies a wireless signal, which is transmitted from the external electronic device and includes an identifier of the electronic device 102, using the second antenna 302, the control circuit 305 may activate all of the three transistors included in the switch 306-2. As the three transistors are activated, the first antenna 301 may have a closed loop structure. The first antenna 301 in the closed loop structure may output a current induced according to a change in the electromagnetic field to the first rectifier circuit 303.

Referring to FIG. 8C, a first switch 306-3 and a second switch 306-4 may be disposed in the first antenna 301, thereby electrically disconnecting a portion of the loop of the first antenna 301 from the remaining portions of the loop, as well as electrically opening the first antenna 301. While at least a portion of the first antenna 301 is electrically disconnected by the switch 306-2, the first switch 306-3, and the second switch 306-4 in FIGS. 8B to 8C, the distortion of the electromagnetic field due to the induction of a current in the first antenna 301 may be prevented. For example, if the electromagnetic field around the first antenna 301 is changed by the wireless communication between electronic devices other than the electronic device 102, the control circuit 305 may electrically disconnect at least a portion of the first antenna 301. According to various embodiments, the first antenna 301 may include a plurality of loops, and each of the loops may be electrically disconnected or connected. For example, the first antenna 301 may include three loops, and each of the loops may not be electrically connected. Alternatively, at least two of the three loops of the first antenna may be electrically connected.

Figure 9:
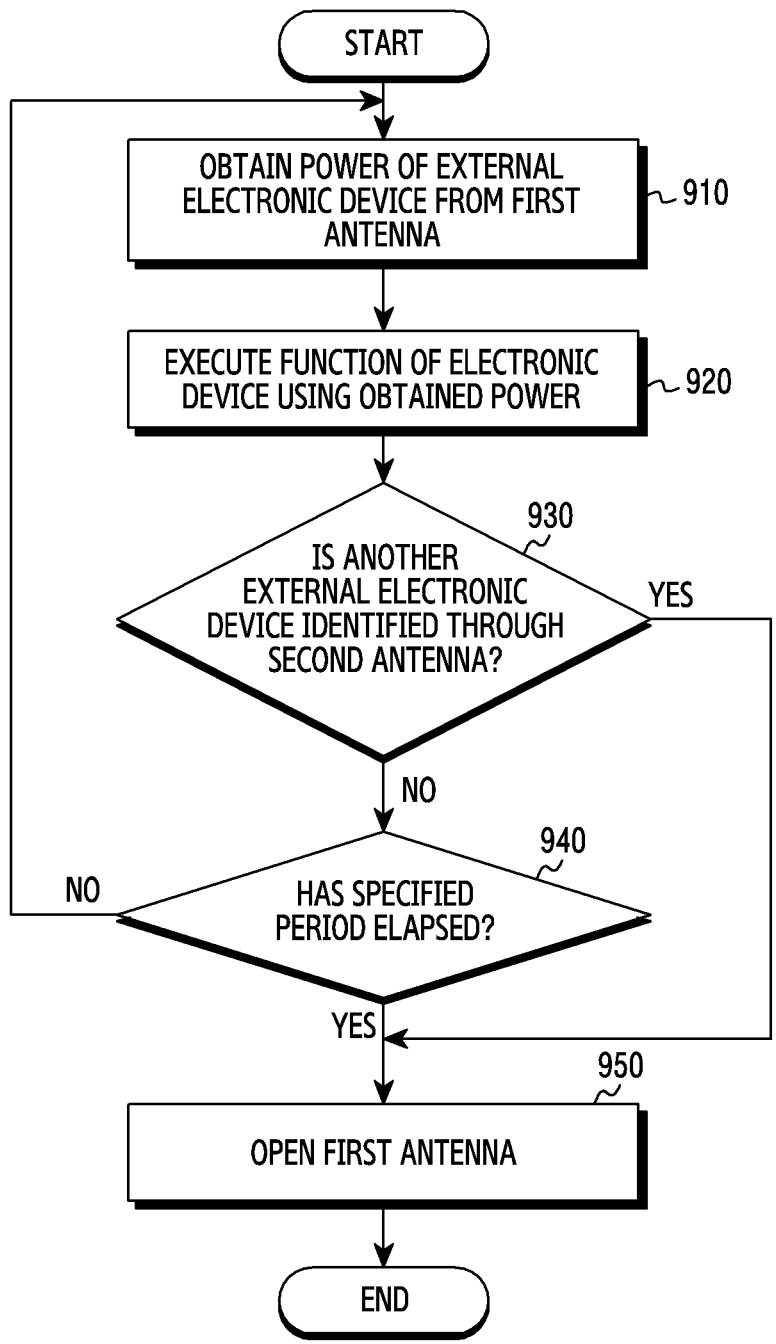
FIG. 9 is a flowchart illustrating an operation in which an electronic device identifies another external electronic device, which is distinguished from an external electronic device transmitting power, and operates in response to a result of identifying another external electronic device according to various embodiments.

FIG. 9 is a flowchart illustrating an operation in which an electronic device identifies another external electronic device, which is distinguished from an external electronic device transmitting power, and operates in response to a result of identifying another external electronic device according to various embodiments. The electronic device in FIG. 9 may correspond to the electronic devices 102 in FIGS. 1, 3A to 3B, 5A to 5B, and 6. The external electronic device in FIG. 9 may correspond to the external electronic devices 320 in FIGS. 3A to 3B, 5A to 5B, and 6. Another external electronic device in FIG. 9 may correspond to another external electronic device 530 in FIGS. 5A to 5B and 6.

Referring to FIG. 9, in operation 910, the electronic device may obtain power transmitted from the external electronic device through a first antenna. The first antenna may correspond to the first antenna 301 in FIGS. 3A to 3B. Obtaining the power by the electronic device using the first antenna may be performed using a second antenna (e.g., the second antenna 302 in FIGS. 3A to 3B) distinguished from the first antenna in response to reception of a wireless signal including identification information corresponding to the electronic device. Obtaining the power by the electronic device using the first antenna may be performed based on operations 410 to 440 in FIG. 4 or operations 710 to 730 in FIG. 7. The first antenna may have a closed loop structure by a closed switch (e.g., the switch 306 in FIGS. 3A to 3B) while operation 910 is performed.

Referring to FIG. 9, in operation 920, the electronic device may execute at least some of the functions of the electronic device using the power obtained from the first antenna. The functions may be associated with electronic components (e.g., the LED 308, the touch sensor 309, and the speaker 310 in FIGS. 3A to 3B and the like), which are included in the electronic device and provide a user experience. The function may be executed based on a wireless signal of the external electronic device, which is obtained through the second antenna. Operation 920 may correspond to operation 450 in FIG. 4. Operation 920 may be performed by, for example, the main control circuit 307 in FIGS. 3A to 3B.

Referring to FIG. 9, in operation 930, the electronic device may identify another external electronic device using the second antenna. Operation 930 may correspond to operation 460 in FIG. 4. The electronic device may perform a polling operation of detecting another external electronic device using the second antenna. Operation 930 may be performed by, for example, the second control circuit 305 of the electronic device 102 in FIG. 3B.

If another external electronic device is identified using the second antenna, the electronic device may open the first antenna in operation 950. The first antenna may maintain the electrically open loop structure after operation 950. The electronic device may stop the function that has been executed, based on operation 920, in response to the identification of another external electronic device. Operation 950 may correspond to operation 470 in FIG. 4.

For example, the control circuit 307 in FIG. 3A or the second control circuit 305 in FIG. 3B may change the switch 306 into an open state, or may maintain the state thereof in response to the identification of another external electronic device. The second control circuit 305 in FIG. 3B may notify the first control circuit 307 of the identification of another external electronic device. The control circuit 307 in FIG. 3A or the first control circuit 307 in FIG. 3B may stop the operation of an electronic component for providing a user experience in response to the identification of another external electronic device. Before stopping the operation of the electronic component, the control circuit 307 in FIG. 3A or the first control circuit 307 in FIG. 3B may perform a separate operation of notifying of stoppage of a running function (e.g., an operation of emitting a specified light using the LED 308 in FIGS. 3A to 3B or an operation of outputting a specified audio signal using the speaker 310).

Referring to FIG. 9, if another external electronic device is not identified using the second antenna, the electronic device may determine whether or not a specified period has elapsed since the power was obtained from the first antenna in operation 940. The period may be a period specified by the electronic device, or may be a period identified from the wireless signal of the external electronic device, which is obtained through the second antenna. The period may be time information related to the operation of the electronic component included in the electronic device.

Referring to FIG. 9, if the specified period elapses after obtaining the power from the first antenna, the electronic device may electrically disconnect the first antenna in operation 950. Electrical disconnection of the first antenna may be performed by, for example, the control circuit 307 and the switch 306 in FIG. 3A or the second control circuit 305 and the switch 306 in FIG. 3B. The electronic device may switch the first antenna to the open loop structure every specified period. Obtaining the power from the first antenna may be stopped every specified period. While the first antenna is electrically disconnected, the electronic device may continuously execute at least some of the functions of the electronic device using a battery included therein.

The electronic device may switch the first antenna from the open loop structure to the closed loop structure every specified period. As the first antenna is electrically reconnected, the first antenna may resume obtaining power from the external electronic device.

Figure 10A:
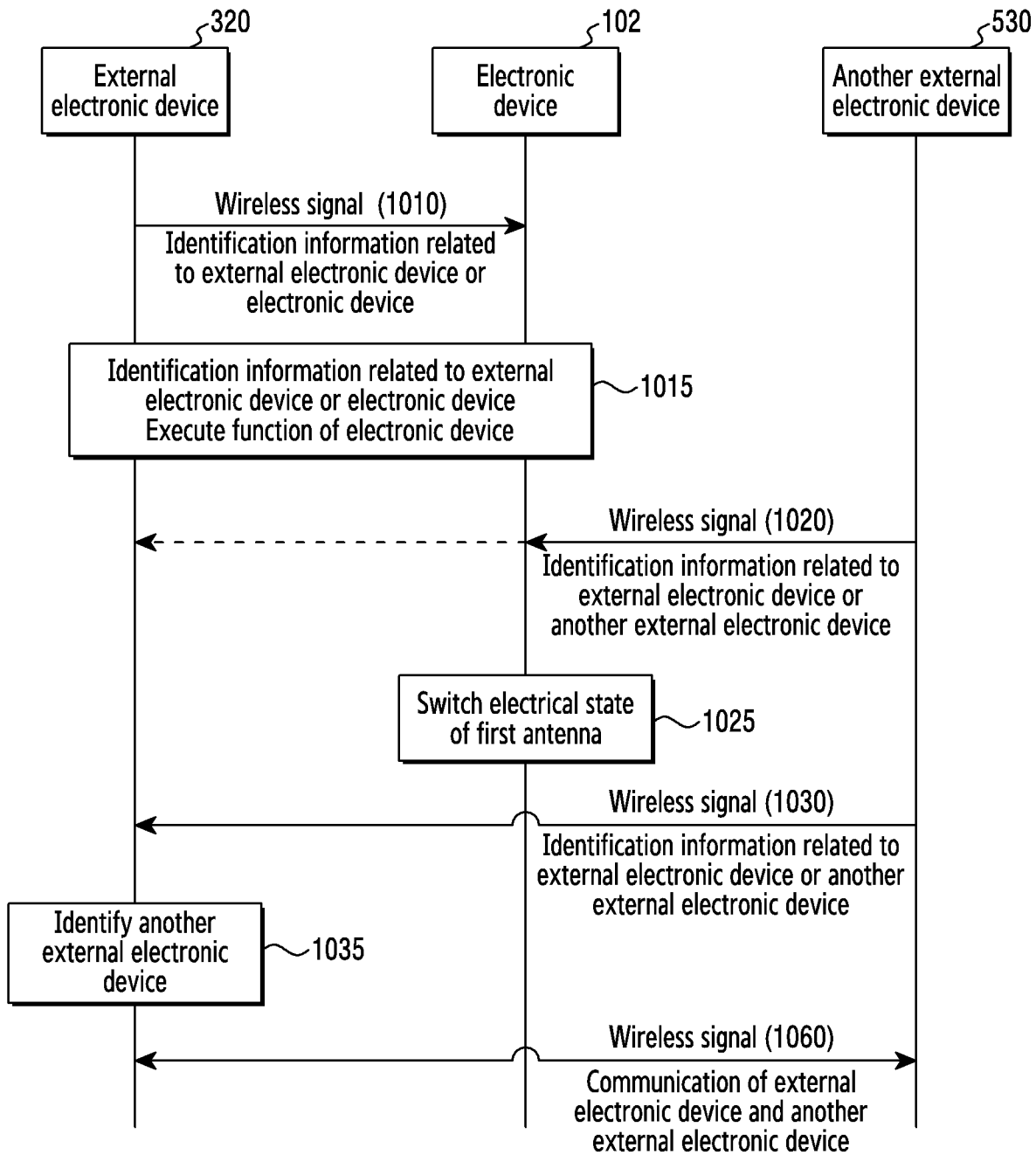
FIGS. 10A to 10B are signal flowcharts illustrating signals that an electronic device transmits to an external electronic device and another external electronic device according to various embodiments.
Figure 10B:
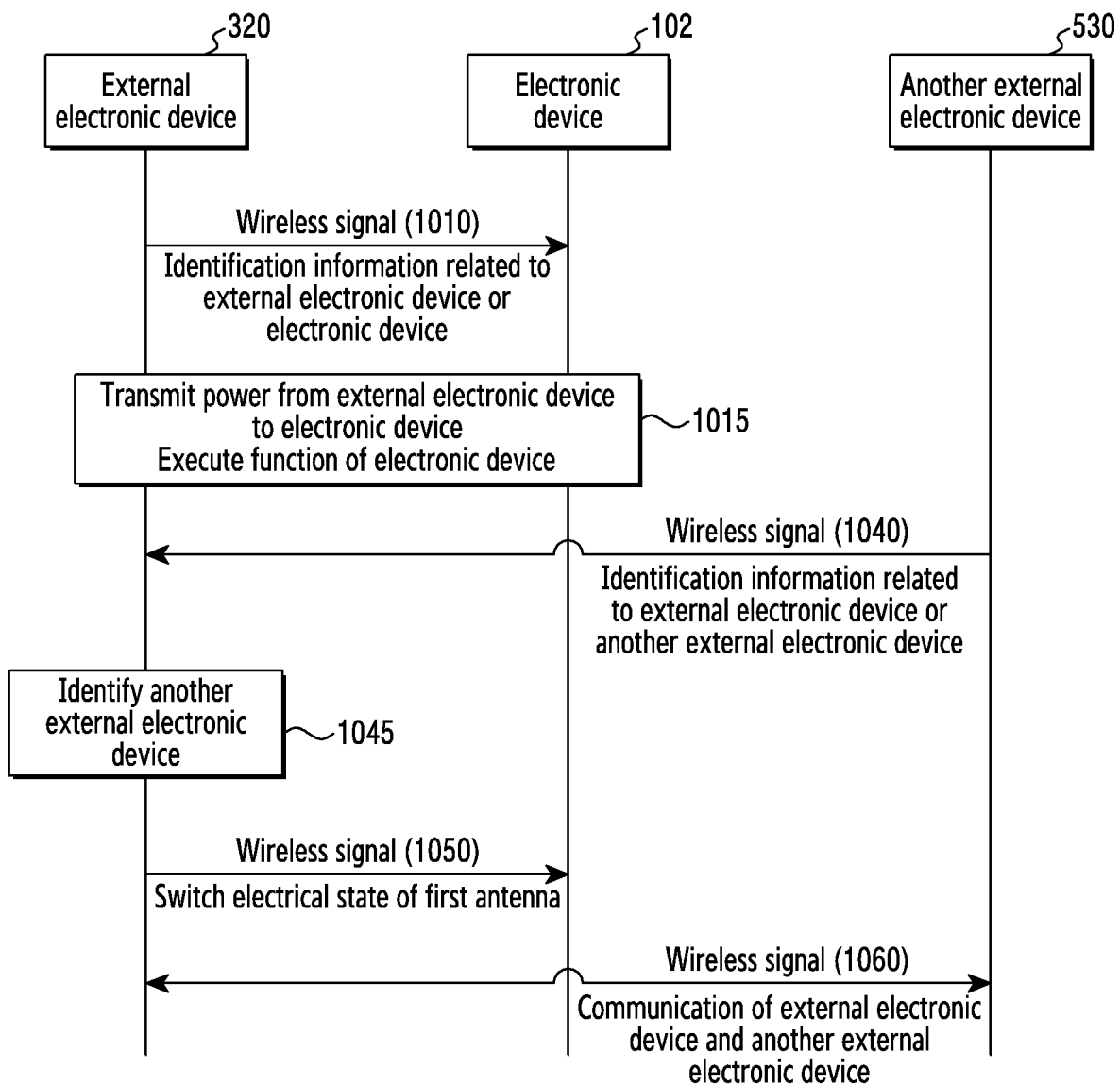

FIGS. 10A to 10B are signal flowcharts illustrating signals that an electronic device 102 transmits to an external electronic device 320 and another external electronic device 530 according to various embodiments. The electronic device 102 in FIGS. 10A to 10B may correspond to the electronic devices 102 in FIGS. 1, 3A to 3B, 5A to 5B, and 6. The external electronic device 320 in FIGS. 10A to 10B may correspond to the external electronic devices 320 in FIGS. 3A to 3B, 5A to 5B, and 6. Another external electronic device in FIGS. 10A to 10B may correspond to another external electronic device 530 in FIGS. 5A to 5B and 6. Hereinafter, an operation in which the electronic device 102 identifies the external electronic device 320 and another external electronic device 530 will be described in detail with reference to FIGS. 10A to 10B.

Referring to FIGS. 10A to 10B, interaction between the external electronic device 320 and the electronic device 102 may be initiated by a wireless signal 1010 transmitted from the external electronic device 320. The interaction may include execution of a function related to a user experience of the electronic device 102 at request of the external electronic device 320 and wireless communication between the electronic device 102 and the external electronic device 320 in response to a user input to the electronic device 102. The wireless signal 1010 may be generated based on an NFC technology. The wireless signal 1010 may include identification information related to the external electronic device 320 or the electronic device 102.

The interaction may include transfer of power from the external electronic device 320 to the electronic device 102. The interaction may include execution of a specified function of the electronic device under the control of the external electronic device as in operation 1015. The transfer of power from the external electronic device 320 to the electronic device 102 may be performed by a first antenna included in the electronic device 102 (e.g., the first antenna 301 having a relatively large loop in FIGS. 3A to 3B). In response to the initiation of the interaction between the external electronic device 320 and the electronic device 102, the electrical state of the first antenna may switch from an electrical state corresponding to the open circuit to an electrical state corresponding to the closed circuit by means of a switch (e.g., the switch 306 in FIGS. 3A to 3B) disposed in an open portion of the first antenna.

While the interaction between the external electronic device 320 and the electronic device 102 is being performed, another external electronic device 530 may approach the external electronic device 320 and the electronic device 102. Another external electronic device 530 may output a wireless signal 1020 including information for communication with the external electronic device 320 (e.g., an identifier of the external electronic device 320 including an IP address, a MAC address, or the like, or an identifier of another external electronic device 530 including a MAC address or the like).

The external electronic device 320 may be embraced in the housing of the electronic device 102, similarly to the embodiment described with reference to FIG. 5B. If the first antenna of the electronic device 102 is in the electrical state corresponding to the closed circuit, the electromagnetic field may be changed by the first antenna as a current induced by the electromagnetic field is generated in the first antenna. As the electromagnetic field is changed by the first antenna, the wireless signal 1020 may not reach the external electronic device 320, and may be blocked by the first antenna or the strength of the signal may be reduced. Loss of the wireless signal 1020 may be caused by the first antenna in the electrical state corresponding to the closed circuit. As the wireless signal 1020 is blocked by the first antenna, wireless communication between the external electronic device 320 and another external electronic device 530 may be blocked. The interference with the wireless communication between the external electronic device 320 and another external electronic device 530 may be caused by the first antenna in the closed structure. A threshold distance (or a recognition distance) between the external electronic device 320 and another external electronic device 530, which is required for the successful transmission of the wireless signal 1020, may be a relatively short distance by the first antenna in the closed structure (e.g., a shorter distance than that when the electronic device 102 is not located between the external electronic device 320 and another external electronic device 530).

In order to prevent interruption of the wireless communication between the external electronic device 320 and another external electronic device 530, the electronic device 102 may identify the wireless signal 1020 of another external electronic device 530 every specified period as in operation 1025. If the identification information included in the wireless signal 1020 corresponds to the identification information of the external electronic device 320 embraced in the housing of the electronic device 102, the electronic device 102 may switch the electrical state of the first antenna from an electrical state corresponding to the closed circuit to an electrical state corresponding to the open circuit. The first antenna in the electrical state corresponding to the open circuit may not change (e.g., distort) the electromagnetic field because induction of a current by the electromagnetic field does not occur in the first antenna. Since there is no change in the electromagnetic field by the first antenna, a wireless signal 1030 transmitted after the wireless signal 1020 may be transmitted to the external electronic device 320. The wireless signal 1030 may include identification information corresponding to the external electronic device 320 or another external electronic device 530.

In operation 1035, the external electronic device 320 may identify another external electronic device 530, based on the identification information included in the wireless signal 1030. In response to the identification of another external electronic device 530, the external electronic device 320 may initiate wireless communication with another external electronic device 320. Referring to FIG. 10A, a wireless signal 1060 for wireless communication between the external electronic device 320 and another external electronic device 320 may be transmitted after the electrical state of the first antenna switches from the electrical state corresponding to the closed circuit to the electrical state corresponding to the open circuit. As the first antenna switches to the electrical state corresponding to the open circuit, the threshold distance between the external electronic device 320 and another external electronic device 530 may be increased.

Referring to FIG. 10B, although the first antenna is in the electrical state corresponding to the closed circuit, a wireless signal 1040 output from another external electronic device 530 may be transmitted to the external electronic device 320. The wireless signal 1040 may include identification information related to the external electronic device 320 or another external electronic device 530. In operation 1045, the external electronic device 320 may identify, based on the identification information included in the wireless signal 1040, whether or not the wireless signal 1040 is generated to target the external electronic device 320, or may identify another external electronic device 530 that generates the wireless signal 1040. In response to reception of the wireless signal 1040 including the identification information corresponding to the external electronic device 320, the external electronic device 320 may transmit, to the electronic device 102, a wireless signal 1050 including a request for changing the electrical state of the first antenna. In response to a reception of the wireless signal 1050, the electronic device 102 may switch the electrical state of the first antenna from the electrical state corresponding to the closed circuit to the electrical state corresponding to the open circuit. In some embodiments, the external electronic device 320 may stop transmitting the wireless signal 1010 to the electronic device 102 in response to reception of the wireless signal 1040. The external electronic device 320 may not transmit a wireless signal related to control of an electronic component or the switch 306, which is included in the electronic device 102, or may not transmit identification information associated therewith. In response to identifying the stoppage of transmission of the wireless signal 1010, the electronic device 102 may switch the electrical state of the first antenna from the electrical state corresponding to the closed circuit to the electrical state corresponding to the open circuit.

As the electrical state of the first antenna switches from the electrical state corresponding to the closed circuit to the electrical state corresponding to the open circuit, there may be no change in the electromagnetic field by the first antenna. As the electromagnetic field is not changed by the first antenna, a wireless signal 1060, which is transmitted subsequent to the wireless signal 1050 for wireless communication between the external electronic device 320 and another external electronic device 420, may be transmitted without being blocked by the first antenna. The attenuation of the wireless signal 1060 for the wireless communication between the external electronic device 320 and another external electronic device 420 may be minimized by the first antenna.

Figure 11:
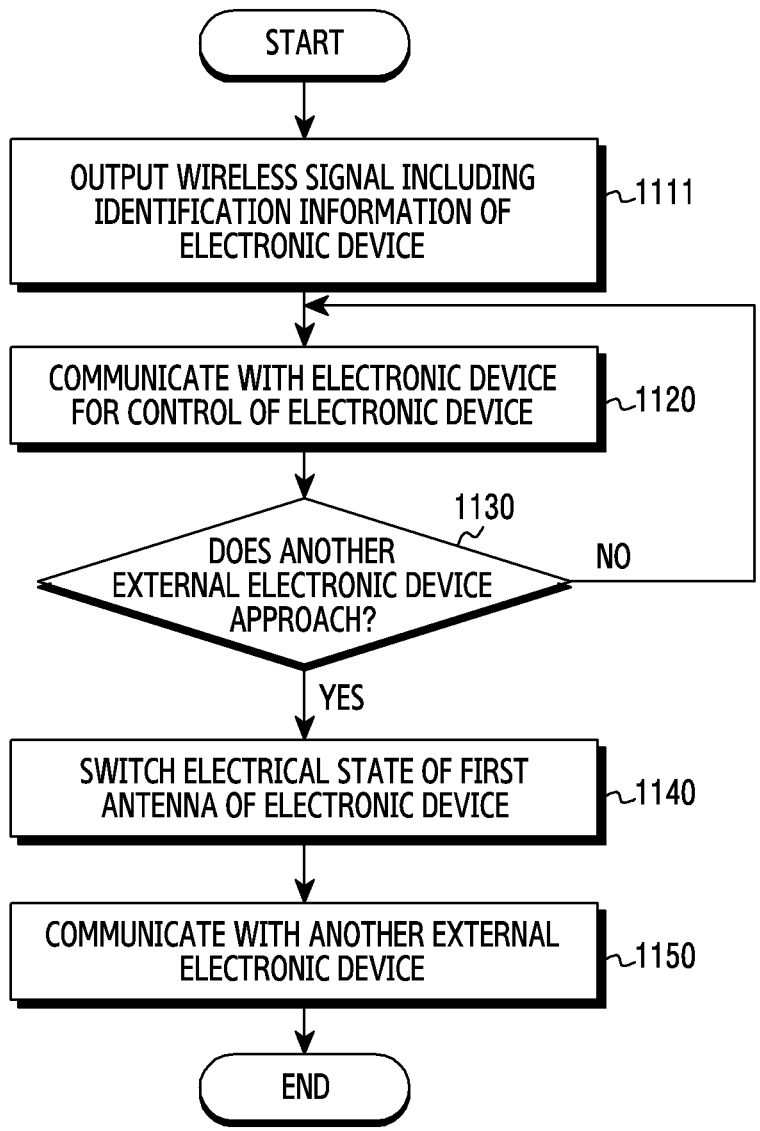
FIG. 11 is a flowchart illustrating an operation performed by an external electronic device in response to an electronic device capable of selectively opening or closing at least a portion of a first antenna according to various embodiments.

FIG. 11 is a flowchart illustrating an operation performed by an external electronic device in response to an electronic device capable of selectively opening or closing at least a portion of a first antenna according to various embodiments. The electronic device in FIG. 11 may correspond to the electronic devices 102 in FIGS. 1, 3A to 3B, 5A to 5B, and 6. The external electronic device in FIG. 11 may correspond to the external electronic devices 320 in FIGS. 3A to 3B, 5A to 5B, and 6.

Referring to FIG. 11, in operation 1110, the external electronic device may output a wireless signal including identification information or authentication information related to the electronic device or the external electronic device to the outside. The wireless signal may be generated in response to identification of the electronic device. The wireless signal may be input to the electronic device by a second antenna having a smaller size than that of the first antenna of the electronic device. The electronic device may determine whether or not to switch the first antenna from an open loop structure to a closed loop structure, based on the identification information included in the wireless signal.

Referring to FIG. 11, in operation 1120, the external electronic device may communicate with the electronic device in order to control the electronic device. The external electronic device may generate a wireless signal for controlling electronic components included in the electronic device (e.g., the LED 308, the touch sensor 309, the speaker 310, and the like in FIGS. 3A to 3B). The electronic device may receive a wireless signal for controlling the electronic components included in the electronic device using the first antenna or the second antenna. The electronic device may obtain power to be supplied to the electronic components from the wireless signal using the first antenna.

Referring to FIG. 11, in operation 1130, the external electronic device may identify an approach of another external electronic device. The approach of another external electronic device may be identified based on reception of a wireless signal (e.g., the wireless signal 1040 in FIG. 10B) generated by another external electronic device. If the user moves the external electronic device to another external electronic device, the external electronic device may identify the approach of another external electronic device.

If another external electronic device approaches the external electronic device, the external electronic device may request the electronic device to switch the electrical state of the first antenna in operation 1140. In response to the request, the electronic device may switch the electrical state of the first antenna from an electrical state corresponding to the closed circuit to an electrical state corresponding to the open circuit. The electronic device may switch the first antenna from a closed loop structure to an open loop structure. Obtaining of power using the first antenna may be stopped in the electronic device according to the request.

Referring to FIG. 11, in operation 1150, the external electronic device may communicate with another external electronic device. The first antenna switched to the open loop structure may not interfere with wireless communication between the external electronic device and another external electronic device. That is, the wireless signal transmitted between the external electronic device and another external electronic device may not be distorted by the first antenna.

According to various embodiments, the electronic device may execute at least one function, based on the wireless signal transmitted from the external electronic device. The electronic device may include a first antenna for obtaining power to be used for execution of the function from the wireless signal and a second antenna for identifying information related to the function from the wireless signal. The first antenna, which is larger than the second antenna, may be selectively opened or connected by a switch. If the wireless signal transmitted from the external electronic device includes identification information corresponding to the electronic device, the first antenna may be electrically connected to have a closed loop structure. Obtaining of power using the first antenna may be performed in response to transmission of the wireless signal including the identification information corresponding to the electronic device. In response to an approach of another external electronic device, which is distinguished from the external electronic device, the electronic device may electrically disconnect the first antenna. The first antenna may be electrically disconnected to have an open loop structure. The first antenna in the open loop structure may not interfere with the wireless communication between the external electronic device and another external electronic device.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

The invention claimed is:

1. An electronic device comprising:
a first loop antenna;
a second loop antenna disposed to at least partially overlap the first loop antenna;
a switch configured to selectively open or connect the first loop antenna; and
a control circuit, wherein the control circuit is configured to:
receive identification information using the second loop antenna in a state in which the first loop antenna is electrically opened,
electrically connect the first loop antenna using the switch, based at least on the identification information, and
wirelessly receive power from an external electronic device using the first loop antenna in a state in which the first loop antenna is electrically connected.

2. The electronic device of claim 1, further comprising one or more light-emitting diodes (LEDs), wherein the control circuit is configured to drive the one or more light-emitting diodes using at least the received power.

3. The electronic device of claim 2, further comprising a power rectifier circuit connected to the first loop antenna and configured to control the power received from the external electronic device through the first loop antenna in the state of being electrically connected to the first loop antenna, wherein the one or more light-emitting diodes are connected to the power rectifier circuit and emit light, based on power adjusted by the power rectifier circuit.

4. The electronic device of claim 3, wherein the one or more light-emitting diodes stop emitting the light as output of power from the power rectifier circuit is stopped in response to an operation in which the first loop antenna is electrically opened using the switch.

5. The electronic device of claim 1, wherein if identification information, which does not correspond to specified identification information, is received from the second loop antenna in a state in which the first loop antenna is electrically connected, the control circuit switches the first loop antenna from the electrically connected state to an electrically opened state using the switch.

6. The electronic device of claim 1, wherein the control circuit electrically connects the first loop antenna if the received identification information corresponds to specified identification information.

7. An electronic device that is attachable to an external electronic device, the electronic device comprising:
a first antenna;
a second antenna;
a switch disposed on the first antenna and configured to switch an electrical state of the first antenna; and
a control circuit operatively coupled to the switch, wherein the control circuit is configured to:
obtain power from the external electronic device using the first antenna in an electrical state corresponding to a closed circuit in a state in which the electronic device is attached to the external electronic device, identify that another external electronic device, which is distinguished from the external electronic device, approaches the electronic device attached to the external electronic device using the second antenna while obtaining the power, and switch the electrical state of the first antenna from the electrical state corresponding to the closed circuit to an electrical state corresponding to an open circuit by controlling the switch in response to the approach of the another external electronic device.

8. The electronic device of claim 7, wherein the control circuit identifies the another external electronic device, based on whether or not a specified signal is received through the second antenna.

9. The electronic device of claim 7, wherein obtaining the power from the external electronic device using the first antenna is stopped in response to switching of the electrical state of the first antenna to the electrical state corresponding to the open circuit.

10. The electronic device of claim 7, wherein the first antenna has a loop shape having an open portion, and
wherein the switch is configured to:
configure the electrical state of the first antenna as an electrical state corresponding to the closed circuit by electrically connecting the open portion while obtaining the power, and
configure the electrical state of the first antenna as an electrical state corresponding to the open circuit by electrically disconnecting the open portion, based on a signal of the control circuit, which is received in response to identification of the approach of the another external electronic device.

11. The electronic device of claim 7, wherein the second antenna remains in the electrical state corresponding to the closed circuit, independently of the electrical state of the first antenna.

12. The electronic device of claim 7, wherein the power is obtained from a current generated in the first antenna by an electromagnetic field generated in a space around the first antenna by the external electronic device while the first antenna is in the electrical state corresponding to the closed circuit.

13. The electronic device of claim 7, wherein the control circuit identifies information output from the external electronic device or the another external electronic device using the second antenna in the electrical state corresponding to the closed circuit.

14. The electronic device of claim 7, further comprising at least one light-emitting diode configured to emit light using the power obtained using the first antenna, wherein emitting the light using the light-emitting diode is stopped in response to the approach of the another external electronic device.

15. The electronic device of claim 7, wherein the control circuit controls the switch so as to switch the electrical state of the first antenna to the electrical state corresponding to the closed circuit in response to reception of specified information from the external electronic device.

* * * * *